United States Patent
Choi et al.

(10) Patent No.: US 9,746,996 B2
(45) Date of Patent: Aug. 29, 2017

(54) HEATING, VENTILATION, AND/OR AIR CONDITIONING CONTROLLER WITH A TOUCH SCREEN DISPLAY

(71) Applicant: LG ELECTRONICS INC., Seoul (KR)

(72) Inventors: Yonghyun Choi, Changwon-Si (KR); Hongku Lee, Changwon-Si (KR); Byungku Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 462 days.

(21) Appl. No.: 14/226,090

(22) Filed: Mar. 26, 2014

(65) Prior Publication Data

US 2015/0094861 A1    Apr. 2, 2015

(30) Foreign Application Priority Data

Oct. 1, 2013    (KR) .................... 10-2013-0117426

(51) Int. Cl.
*G01M 1/38* (2006.01)
*G06F 3/0482* (2013.01)
(Continued)

(52) U.S. Cl.
CPC ....... *G06F 3/0482* (2013.01); *B60H 1/00985* (2013.01); *F24F 11/0086* (2013.01);
(Continued)

(58) Field of Classification Search
None
See application file for complete search history.

(56) References Cited

U.S. PATENT DOCUMENTS 5,775,406 A * 7/1998 Ghitea, Jr. ............. B60H 1/008
                                                          165/11.1
2001/0026761 A1* 10/2001 Repple .................... F01P 5/10
                                                          417/292
(Continued)

FOREIGN PATENT DOCUMENTS

CN    1914571    2/2007
CN    101017421    8/2007
(Continued)

OTHER PUBLICATIONS

U.S. Office Action dated May 19, 2016 issued in U.S. Appl. No. 14/231,923.
(Continued)

*Primary Examiner* — Adam Lee
(74) *Attorney, Agent, or Firm* — KED & Associates, LLP

(57) ABSTRACT

A heating, ventilation, or air conditioning (HVAC) controller for controlling one or more components of a HVAC system or monitoring a state thereof is provided. The HVAC controller may include a touch screen display configured to receive a parameter setting command input by a user's touch, and a controller connected with the touch screen display to display a screen on the touch screen display. The controller may display a function selection screen to select a type of a limit function when the controller receives a command for selecting limit functions of one or more components of the HVAC system. Further, the controller may display a set-up screen to input a limit parameter on the touch screen display when a specific limit function is selected on the function selection screen, and the set-up screen may include a set-up button to input the limit parameter.

18 Claims, 51 Drawing Sheets

(51) Int. Cl.
*G06F 3/0488* (2013.01)
*F24F 11/00* (2006.01)
*G06F 3/0484* (2013.01)
*B60H 1/00* (2006.01)

(52) U.S. Cl.
CPC ........ *G06F 3/0488* (2013.01); *G06F 3/04847* (2013.01); *F24F 2011/0091* (2013.01)

(56) References Cited

U.S. PATENT DOCUMENTS

| | | | |
|---|---|---|---|
| 2003/0115895 A1* | 6/2003 | Beaverson | G05B 5/01 62/227 |
| 2003/0143084 A1* | 7/2003 | Repple | F01P 5/10 417/292 |
| 2003/0233432 A1* | 12/2003 | Davis | H04L 41/0253 709/222 |
| 2005/0156052 A1* | 7/2005 | Bartlett | F24F 11/0001 236/49.3 |
| 2006/0042276 A1* | 3/2006 | Doll, Jr. | F25B 49/005 62/129 |
| 2006/0064325 A1 | 3/2006 | Matsumoto et al. | |
| 2009/0140056 A1 | 6/2009 | Leen | |
| 2009/0143879 A1 | 6/2009 | Amundson et al. | |
| 2010/0070089 A1* | 3/2010 | Harrod | F24F 11/0086 700/277 |
| 2010/0070093 A1* | 3/2010 | Harrod | F24F 11/0086 700/278 |
| 2010/0107076 A1 | 4/2010 | Grohman et al. | |
| 2010/0204945 A1* | 8/2010 | Shahi | F25B 49/005 702/100 |
| 2010/0263391 A1* | 10/2010 | Tetu | F04D 27/0253 62/89 |
| 2010/0324962 A1 | 12/2010 | Nesler et al. | |
| 2011/0113120 A1* | 5/2011 | Johnson | G05B 15/02 709/218 |
| 2011/0160914 A1* | 6/2011 | Kennett | F24F 13/14 700/276 |
| 2011/0211851 A1 | 9/2011 | Imine et al. | |
| 2012/0026004 A1* | 2/2012 | Broniak | E03B 7/075 340/870.02 |
| 2012/0323374 A1* | 12/2012 | Dean-Hendricks | F24F 11/0012 700/276 |
| 2012/0323375 A1* | 12/2012 | Dean-Hendricks | F24F 3/1603 700/276 |
| 2013/0024799 A1 | 1/2013 | Fadell et al. | |
| 2013/0085620 A1* | 4/2013 | Lu | H04L 12/2807 700/286 |
| 2013/0154839 A1* | 6/2013 | Barton | F24F 11/0086 340/584 |
| 2013/0158714 A1* | 6/2013 | Barton | G05D 23/1917 700/276 |
| 2013/0158715 A1* | 6/2013 | Barton | G05D 23/1902 700/276 |
| 2013/0158717 A1* | 6/2013 | Zywicki | F24F 11/0086 700/276 |
| 2013/0158718 A1* | 6/2013 | Barton | F24F 11/0086 700/276 |
| 2013/0158723 A1* | 6/2013 | Erickson | F24F 11/0086 700/278 |
| 2013/0173101 A1* | 7/2013 | Gilman | B60R 16/02 701/22 |
| 2013/0226352 A1 | 8/2013 | Dean-Hendricks et al. | |
| 2013/0231793 A1* | 9/2013 | Elliott | G05B 15/02 700/292 |
| 2013/0263034 A1 | 10/2013 | Bruck et al. | |
| 2013/0282624 A1 | 10/2013 | Schackmuth et al. | |
| 2014/0200718 A1* | 7/2014 | Tessier | F24F 11/0009 700/276 |
| 2014/0214212 A1* | 7/2014 | Leen | F24F 11/0086 700/276 |
| 2014/0260965 A1* | 9/2014 | Finkam | B01D 53/30 95/12 |
| 2014/0277767 A1 | 9/2014 | Othman | |
| 2014/0358291 A1* | 12/2014 | Wells | G05D 23/1902 700/276 |
| 2015/0021005 A1* | 1/2015 | Land, III | F24F 11/0012 165/214 |
| 2015/0027681 A1* | 1/2015 | Ragland | F24F 11/0012 165/250 |
| 2015/0032264 A1* | 1/2015 | Emmons | F24F 11/0017 700/276 |

FOREIGN PATENT DOCUMENTS

| | | |
|---|---|---|
| CN | 101029763 | 9/2007 |
| CN | 102077031 | 5/2011 |
| CN | 102105751 | 6/2011 |
| CN | 102177401 | 9/2011 |
| CN | 102625942 | 8/2012 |
| JP | 2007-205649 | 8/2007 |

OTHER PUBLICATIONS

U.S. Office Action dated Jun. 28, 2016 issued in U.S. Appl. No. 14/243,157.
U.S. Office Action dated May 2, 2016 issued in U.S. Appl. No. 14/224,490.
U.S. Office Action dated Aug. 31, 2016 issued in U.S. Appl. No. 14/224,490.
U.S. Office Action dated Nov. 2, 2016 issued in U.S. Appl. No. 14/231,923.
Chinese Office Action dated Nov. 22, 2016 issued in Application No. 201310741155.6 (with English translation).
Chinese Office Action dated Nov. 22, 2016 issued in Application No. 201310741119.X (with English translation).
United States Office Action dated Dec. 29, 2016 issued in co-pending U.S. Appl. No. 14/243,157.
U.S. Office Action dated May 18, 2017 issued in co-pending related U.S. Appl. No. 14/231,923.
U.S. Office Action dated Jun. 2, 2017 issued in co-pending related U.S. Appl. No. 14/243,157.

* cited by examiner

Normal

Compared with last year, you have used

0 kWh of electricity.

Bad

Compared with last year, you have wasted

400 kWh of electricity.

HEATING, VENTILATION, AND/OR AIR CONDITIONING CONTROLLER WITH A TOUCH SCREEN DISPLAY

CROSS-REFERENCE TO RELATED APPLICATION(S)

The present application claims priority under 35 U.S.C. 119 and 35 U.S.C. 365 to Korean Patent Application No. 10-2013-0117426, filed in Korea on Oct. 1, 2013, which is hereby incorporated by reference in its entirety.

BACKGROUND

1. Field

A heating, ventilation and/or air conditioning (HVAC) (hereinafter, referred to as "HVAC") system is used for convenience of interior space in a building or other sites. A lot of HVAC controllers are used to control one or more components of constitute the HVAC system. An HVAC controller is disclosed herein.

2. Background

Heating, ventilation, and/or air conditioning controllers are known. However, they suffer from various disadvantages.

BRIEF DESCRIPTION OF THE DRAWINGS

Embodiments will be described in detail with reference to the following drawings in which like reference numerals refer to like elements, and wherein:

FIG. 50 illustrates a screen on which alarm information pops up in a state where an alarm for the operating time limit function is on; and FIG. 51 illustrates a screen on which the alarm information pops up in a state where an alarm for the energy usage limit function is on.

DETAILED DESCRIPTION

Figure 1:
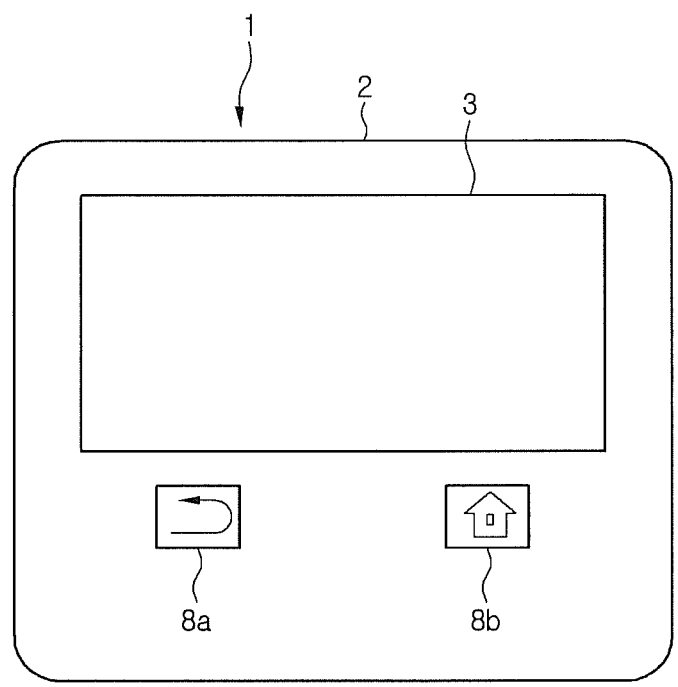
FIG. 1 is a schematic diagram of an HVAC controller according to embodiments.

Hereinafter, embodiments will be described with reference to the accompanying drawings. Regarding reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation.

Also, in the description of embodiments, terms such as first, second, A, B, (a), (b) or the like may be used herein when describing components. Each of these terminologies is not used to define an essence, order or sequence of a corresponding component, but used merely to distinguish the corresponding component from other component(s). It should be noted that if it is described that one component is "connected," "coupled" or "joined" to another component, the former may be directly "connected," "coupled," and "joined" to the latter or "connected", "coupled", and "joined" to the latter via another component.

Embodiments disclosed herein may include a controller for various systems including an HVAC system, a security system, a water heating system, a water softener system, a sprinkler system, an illumination system, or similar system, and hereinafter, an HVAC controller for controlling an HVAC system will be described as one example.

Figure 2:
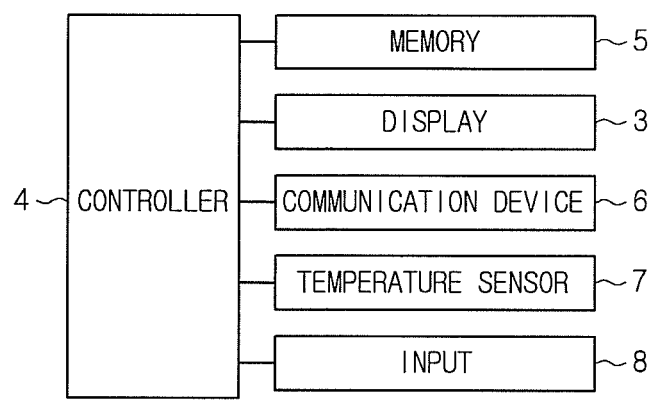
FIG. 2 is a block diagram of the HVAC controller according to embodiments.
Figure 3:
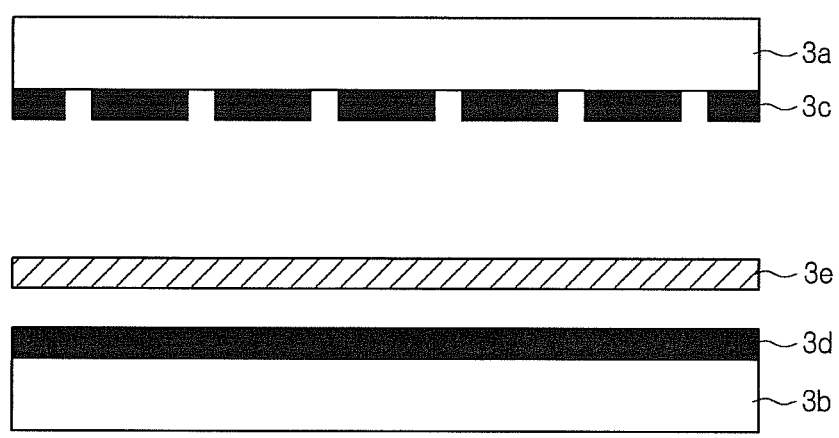
FIG. 3 is a diagram schematically illustrating a touch screen display according to embodiments.

FIG. 1 is a schematic diagram of an HVAC controller according to embodiments. FIG. 2 is a block diagram of the HVAC controller according to embodiments. FIG. 3 is a diagram schematically illustrating a touch screen display according to embodiments.

Referring to FIGS. 1 to 3, an HVAC controller 1 may include a housing 2, a controller 4, a user interface, a memory 5, a communication unit or device 6, and a temperature sensor 7. The controller 4 may control one or more components of the HVAC system and acquire state information of the components. Further, the controller 4 may provide temperature information or time information.

The user interface may allow a user to input various data or a command. The user interface may include a capacitive touch screen display 3 into which a parameter setting command is input by a touch by the user and an input unit or input 8 including one or more mechanical buttons 8a and 8b. The controller 4 may be connected with the touch screen display 3 to display a screen on the touch screen display 3.

The buttons 8a and 8b may include a back button 8a and a home button 8b. When the back button 8a is pressed, the touch screen display 3 may display a previous screen. When the home button 8b is pressed, the touch screen display 3 may display a home screen.

The touch screen display 3 may include a transparent touch panel and an LCD module. The touch panel may be include a cover glass 3a and a film 3b that face each other. A transparent conductive film 3c (indium tin oxide) may be deposited on the cover glass 3a to form an X circuit pattern. Further, a transparent conductive film 3d may be formed on the film 3b to form a Y circuit pattern. In addition, the cover glass 3a may include an X-axis circuit pattern and a film including a Y-axis circuit pattern may be bonded using an optical clear adhesive (OCA) 3e.

FIG. 3 illustrates one example of a touch screen display; however, embodiments are not limited to the touch screen display of FIG. 3, rather, the touch screen display may be configured in various forms.

The touch screen display 3 may serve as a keypad for input as well as a display.

The memory 5 may be electrically connected with the controller 4, and the memory 5 may store an algorithm for the control of the controller 4, a parameter input through the touch screen display 3, and parameters of one or more components of the HVAC system, for example. The controller 4 may store information in the memory 5 or search for information stored in the memory 5. The memory 5 may be various storage devices, including a ROM, a RAM, an EPROM, a flash drive, or a hard drive, for example.

The communication device 6 may communicate with the controller 4, and information may be uploaded to the controller 4 or downloaded from the controller 4 through the communication device 6. Further, the communication device 6 may communicate with the HVAC system through a wired or wireless network. However, the communication device 6 is not limited to a particular communication method.

The temperature sensor 7 may be installed in the housing 2 and sense a temperature of a space in which the HVAC controller 1 is installed. The controller 4 may control one or more components of the HVAC system or parameters of the components using the temperature sensed by the temperature sensor 7. Further, the controller 4 may display the temperature sensed by the temperature sensor 7 on the touch screen display 3.

Figure 4:
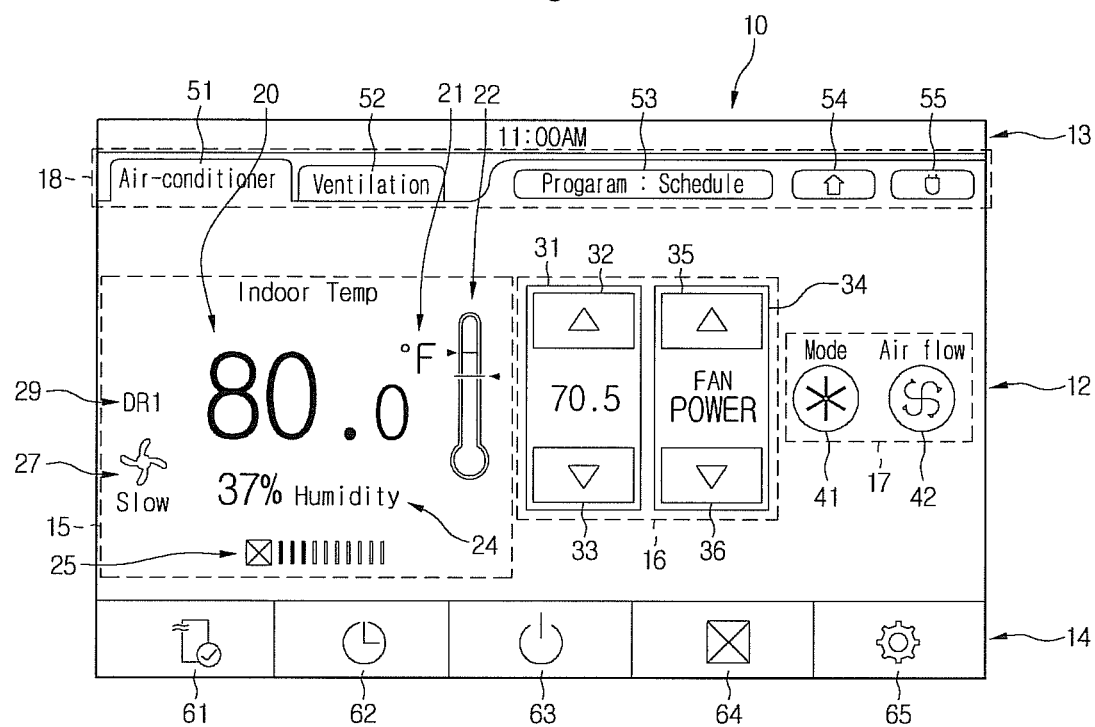
FIGS. 4 and 5 illustrate examples of a home screen which may be displayed in the HVAC controller according to embodiments.
Figure 5:
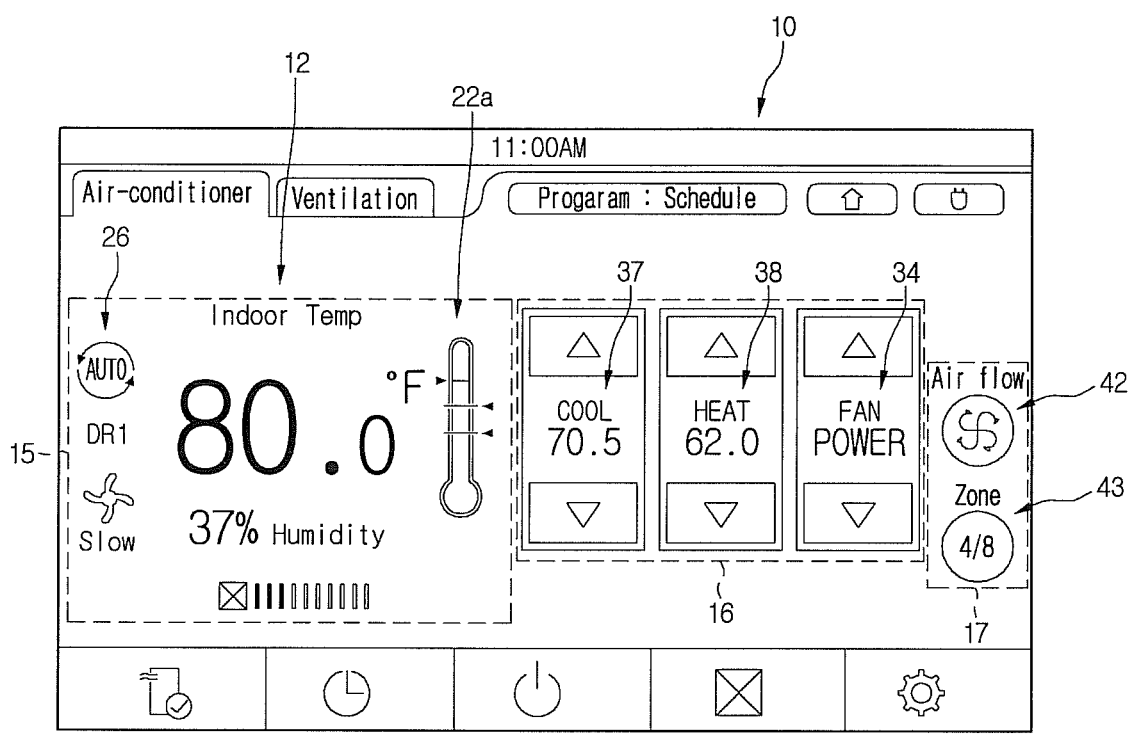

FIGS. 4 and 5 illustrate examples of a home screen which may be displayed in or on the HVAC controller according to embodiments. The HVAC controller 1 may operate in any one mode of a standard mode or a thermostat mode by input of a user command or automatically. A display mode displayed in or on the touch screen display 3 may vary depending on the mode of the HVAC controller 1.

The controller 4 may actuate the touch screen display 3 in a first display mode in the standard mode and actuate the touch screen display 3 in a second display mode in the thermostat mode. When the HVAC controller 1 is actuated in the thermostat mode, one or more components of the HVAC system may be subjected to a heating operation or a cooling operation automatically depending on an indoor or outdoor temperature or operation modes of one or more components may be converted.

FIG. 4 illustrates the home screen in a first display mode. FIG. 5 illustrates the home screen in a second display mode.

Referring to FIG. 4, a home screen 10 may include a first region 12, a second region 13, and a third region 14. The first to third regions 12 to 14 may be divided regions. The first region 12 may be placed or located between the second region 13 and the third region 14. For example, the second region 13 is placed or located above the first region 12, and the third region 14 may be placed or located below the first region 12. Alternatively, the second region 13 may be placed or located at any one side of left and right sides of the first region, and the third region 14 may be placed or located at the other side.

The controller 4 may change information displayed in the respective regions 12 to 14 on one or more screens among a plurality of screens that may be displayed in or on the touch screen display 3. Further, the controller 4 may allow the third region 14 to be removed from one or more screens among the plurality of screens, and the first region 12 to be extended or the third region 14 to be added to the first region 13.

The second region 13 as an indicator region may at least display a current time. A position and size of the second region 13 may be fixed on all screens that may be displayed in the touch screen display 3.

The first region 12 may include a monitoring region 15, a main input region 16, and a sub input region 17. The monitoring region 15 may display various kinds of information, and the main input region 16 and the sub input region 17 may receive a command for selecting or changing the parameter of the HVAC controller 1 or a command for selecting or changing the parameters of one or more components of the HVAC system.

The monitoring region 15 may display a first image, the main input region 16 may display a second image, and the sub input region 17 may display a third image. The controller 4 may vary a number or the type of information displayed in the first image or vary a number or types of parameters displayed in the second image.

The first image may include main information and sub information. In this case, the sub information may be deleted from the first image or added to the first image. That is, the first image may include one or more parameters for monitoring, and the second image may include one or more parameters for setting.

The main information may include temperature information. The temperature information may include an indoor temperature 20 sensed by the temperature sensor 7 and a temperature unit (Fahrenheit or centigrade) 21. Further, the temperature information may include an image 22 for comparing a current temperature (indoor temperature) and a target temperature. For example, the image 22 may have a thermometer shape and may have indicators indicating the target temperature and the current temperature, respectively, but embodiments are not limited thereto.

Further, the main information may include energy usage information 25. The controller 4 may change a shape, size, or color of the energy usage information 25 according to energy usage amounts of one or more components of the HVAC system. For example, the controller 4 may compare a target energy usage amount stored in the memory 5 and a current energy usage amount, and may change the shape, the size, or the color of the energy usage information 25 according to a comparison result.

Although not illustrated, the main information may include operation modes (cooling mode or heating mode) of one or more components of the HVAC system.

The sub information may include at least one of humidity 24, a fan speed 27, and energy saving operation information 29. The energy saving operation information 29 may be information displayed when a specific event occurs. Accordingly, the energy saving operation information 29 may be not displayed in the first image before the event occurs.

The main input region 16 may include a temperature set-up block 31 and a fan speed set-up block 34. The temperature set-up block 31 may be an up button 32 or a down button 33 for setting the target temperature in the cooling mode or heating mode of one or more components of the HVAC system. Further, the temperature set-up block 31 may include a set target temperature. When the up button 32 or the down button 33 is selected, the controller 4 may change a temperature displayed in the monitoring region 15.

In this case, a color of the set target temperature may vary depending on an operation mode of one or more components of the HVAC system. For example, in the case of the cooling mode, the color of the target temperature may be a blue color, and in the case of the heating mode, the color of the target temperature may be a red color.

The fan speed set-up block 34 may include an up button 35 and a down button 36 for setting a fan speed of one or more components of the HVAC system. Further, the fan speed set-up block 34 may include the set fan speed. When the fan speed is changed by the up button 35 or the down button 36, a fan speed 27 displayed in the monitoring region 15 may be changed. That is, the controller 4 may change a parameter displayed in the monitoring region 15 when a command for setting is input through the main input region 16.

The sub input region 17 may include a mode button 41 for selecting a mode of one or more components of the HVAC system and a wind direction button 42 for selecting a wind direction of a fan of one or more components of the HVAC system. The controller 4 may vary a number or a type of information displayed in the sub input region 17.

The first region 12 may include a navigation bar 18. A menu may be selected by using the navigation bar 18. The navigation bar 18 may be placed or located in an upper region of the second region 12. The navigation bar 18 may include an air conditioner button 51, a ventilation button 52, a program button 53, an occupation/inoccupation selection button 54, and an energy button 55.

The air conditioner button 51 and the ventilation button 52 are device selection buttons for selecting a type of device. In the case where the HVAC system includes two or more components, the controller 4 may display a device selection button for selecting each component on the home screen 10. For example, in the case where the HVAC system includes the air conditioner and the ventilation device, the controller 4 may display the air conditioner button 51 and the ventilation button 52 on the home screen 10. In contrast, in the case where the HVAC system includes only any one of the air conditioner or the ventilation device, a device selection button corresponding to the corresponding device may be displayed on the home screen 10 or a device button may not be displayed.

The controller 4 may display an image for controlling or monitoring the air conditioner in the first region 11 when the air conditioner button 51 is selected and displays an image for controlling or monitoring the ventilation device in the first region 11 when the ventilation button 52 is selected.

The third region 14 may include a main button 61, a schedule button 62, an on/off button 63, an energy button 64, and a set-up button 65. One or more components of the HVAC system may be turned on or off by the on/off button 63. In one embodiment, the on/off button 63 may be omitted or substituted with buttons for other functions.

When a power off command of one or more components of the HVAC system by input in the power button 63, the controller 4 may deactivate buttons for inputting parameters displayed in the touch screen display and activate the buttons when a power on command is input.

Next, referring to FIG. 5, the second region 12 may include a monitoring region 15, a main input region 16, and a sub input region 17 in the second display mode. Magnitudes of the main input region 16 and the sub input region 17 in the first display mode may be different from those of the main input region 16 and the sub input region 17 in the second display mode.

Mode information 26 that displays the mode of one or more components of the HVAC system or displays a display mode of the touch screen display may be displayed in addition to the information which may be displayed in the first display mode.

In addition, the monitoring region 15 may display an image 22a for comparing a present temperature, a target cooling temperature, and a target heating temperature. The image 22a may include a mark (including a first mark and a second mark) displaying the target cooling temperature and the target heating temperature, and a color, a magnitude, or a form of a mark of the target heating temperature may be different from the shape, magnitude, or form of a mark of the target cooling temperature.

The main input region 16 may include a cooling temperature set-up block 37, a heating temperature set-up block 38, and a fan speed set-up block 34. The cooling temperature set-up block 37 may include an up button and a down button for setting the cooling temperature and the set target cooling temperature. The heating temperature set-up block 38 may include an up button and a down button for setting the heating temperature and the set target heating temperature.

That is, in the first display mode, the main input region 16 displays a temperature set-up block 32 for setting the temperature in any one of the cooling or heating modes and in the second display mode, the main input region 16 displays both the cooling temperature set-up block 37 and the heating temperature set-up block 38. Of course, in the first display mode, the main input region 16 may display both the cooling temperature set-up block 37 and the heating temperature set-up block 38, but the controller 4 may activate one of the cooling temperature set-up block 37 or the heating temperature set-up block 38 and deactivate the other one based on one or more components of the HVAC system.

In the second display mode, the controller 4 may activate each of the cooling temperature set-up block 37 and the cooling temperature set-up block 38 when one or more components of the HVAC system are in the automatic mode. Further, in the second display mode, when one or more components of the HVAC system are in a mode other than an automatic mode, the controller 4 may deactivate each of the cooling temperature set-up block 37 and the cooling temperature set-up block 38 based on the mode.

Meanwhile, the controller 4 may control one or more components of the HVAC system to satisfy ranges of the target cooling temperature and the target heating temperature when the target cooling temperature and the target heating temperature are set. In this case, the target temperature may be higher than the target heating temperature.

The sub input region 16 may include a wind direction button 42 and a zone button 43. In this case, while the screen is displayed in the first display mode, when the second display mode is selected, the sub input region may delete the mode button 41 or deactivate the mode button 41.

The home screen 10 of FIG. 4 or 5 may be a main screen. That is, the controller 4 may display the home screen 10 of FIG. 4 or 5 among a plurality of screens which may be displayed on the touch screen display 3 when the HVAC controller 1 is turned on. Further, when the home button 4 is pressed, the controller 4 may display the home screen 10 of FIG. 4 or 5 on the touch screen display 3.

Figure 6:
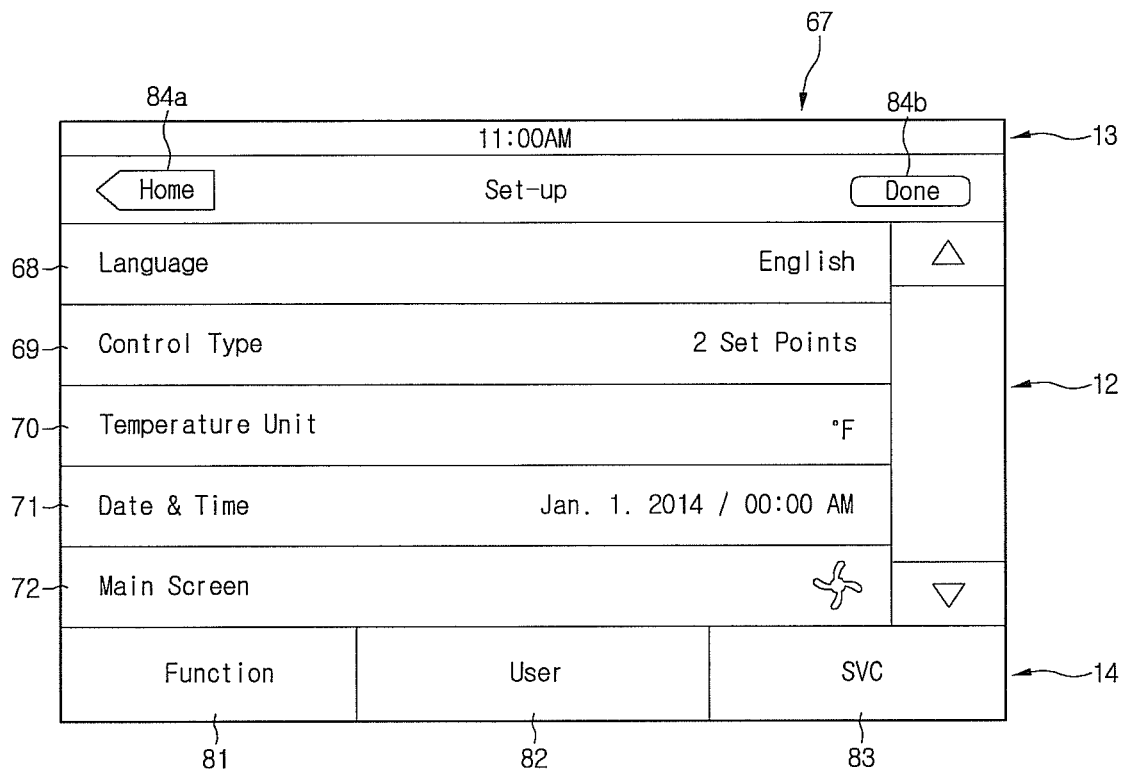
FIGS. 6 to 12 illustrate screens for setting a parameter displayed on a touch screen display of the HVAC controller according to embodiments.

FIGS. 6 to 12 illustrate screens for setting a parameter displayed on a touch screen display of the HVAC controller according to embodiments. FIG. 6 illustrates a screen displayed when a set-up button is selected on the screen of FIG. 4, and screen 67 may include a first region 12, a second region 13, and a third region 14. The first region 12 may include a language button 68 for selecting a display language, a mode button 69 for selecting a control mode, a temperature unit button 70 for selecting a temperature unit, a date and time button 71 for displaying a date and a time, and a main screen button 72 for selecting an item displayed on the main screen. When all buttons are not displayed in the first region 12, the first region 12 may display a scroll button or a scroll bar for the non-displayed buttons.

When the language button 68 is touched, the controller 4 may display a language setting screen on the screen 67. The language button 68 may display a set language.

The third region 14 may include a function button 81, a user button 82, and a service button 83. The first region 12 may be displayed when the user button 82 is selected, for example.

Figure 7:
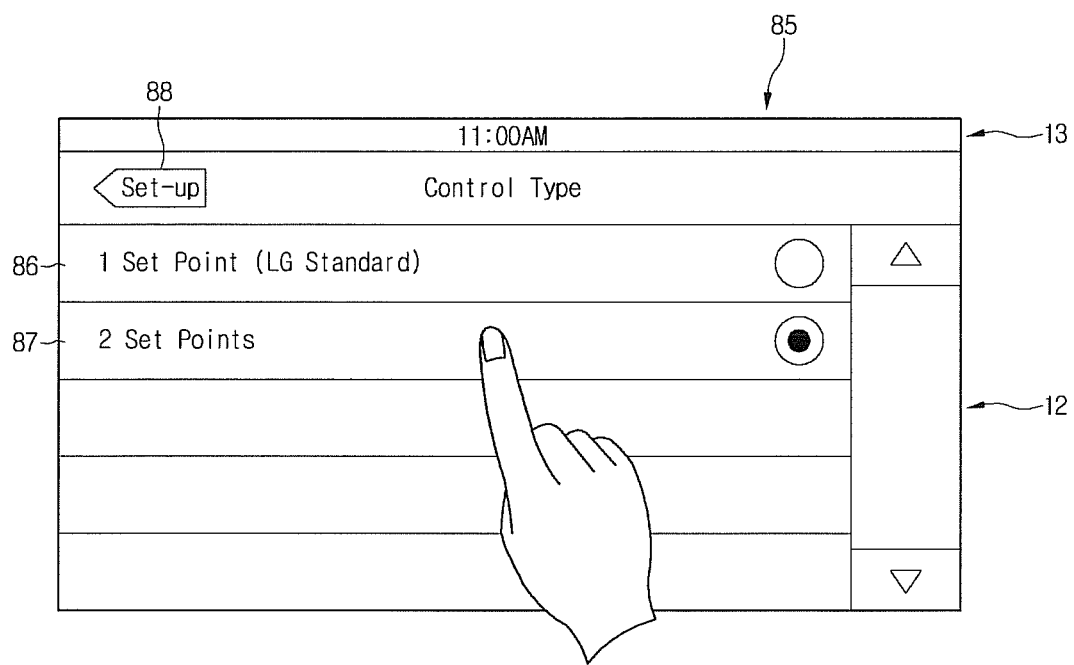

FIG. 7 illustrates a screen displayed when a mode button is selected on the screen of FIG. 6. When the mode button 69 is selected on the screen 67, the controller 4 may display a screen 85 for selecting the mode on the touch screen display 3 as illustrated in FIG. 7.

The screen 85 may include a standard button 86 for selecting the standard mode and a thermostat button 87 for selecting the thermostat mode. Further, the screen 85 may include a set-up button 88 for returning to the screen of FIG. 6. When mode selection is complete in FIG. 7 and the set-up button 88 is selected, the present screen may be switched to the screen of FIG. 6. The mode button 69 may display the selected mode on the screen 67 of FIG. 6.

Figure 8:
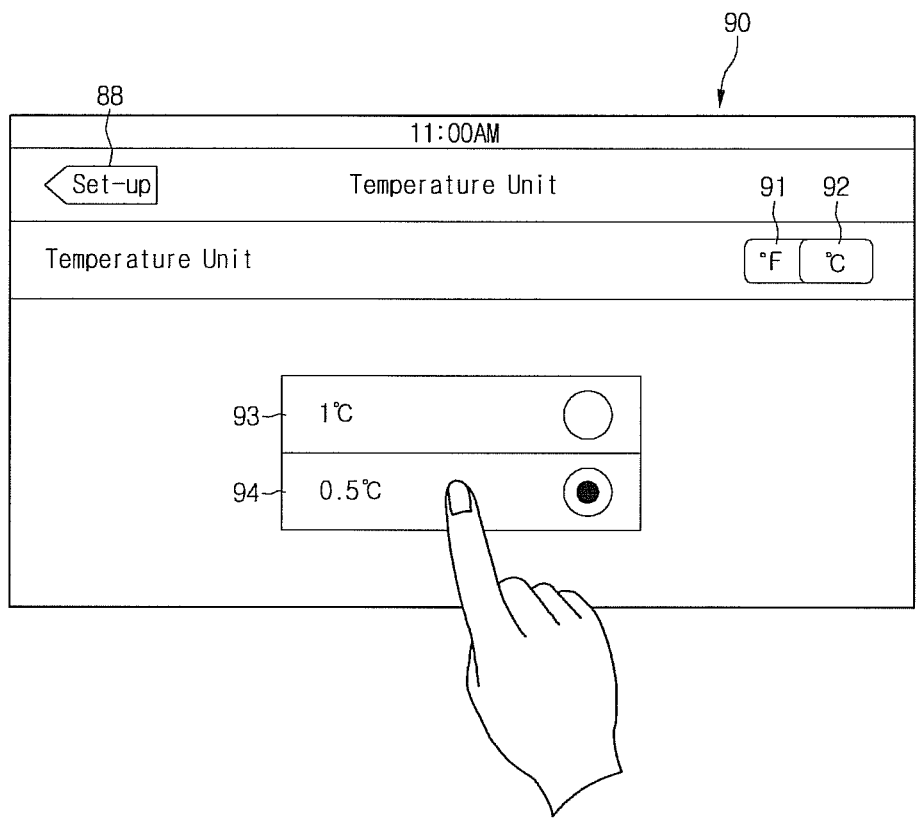

FIG. 8 illustrates a screen displayed when a temperature unit button is selected on the screen of FIG. 6. When the temperature unit button 70 is selected on the screen 67, the controller 4 may display a screen 90 for selecting a temperature unit on the touch screen display 3 as illustrated in FIG. 8.

The screen 90 may include a Fahrenheit button 91 and a centigrade button 92 for selecting the temperature unit. The user may select one of the Fahrenheit button 91 and the centigrade button 92. Alternatively, the screen 90 may include a single button for selecting the temperature unit and select Fahrenheit or centigrade by sliding a button. Further, the screen 90 may include the set-up button 88.

The screen 90 may include a button for selecting a temperature range changed when the up button or the down button for changing a temperature is selected in FIG. 4 or 5. The button may include, for example, a first button 93 for selecting 1 degree Fahrenheit and a second button 94 for selecting 0.5 degrees centigrade; however, embodiments are not so limited. Alternatively, although not illustrated, the button may include, for example, a first button for selecting 2 degrees Fahrenheit and a second button for selecting 1 degree Fahrenheit.

Figure 9:
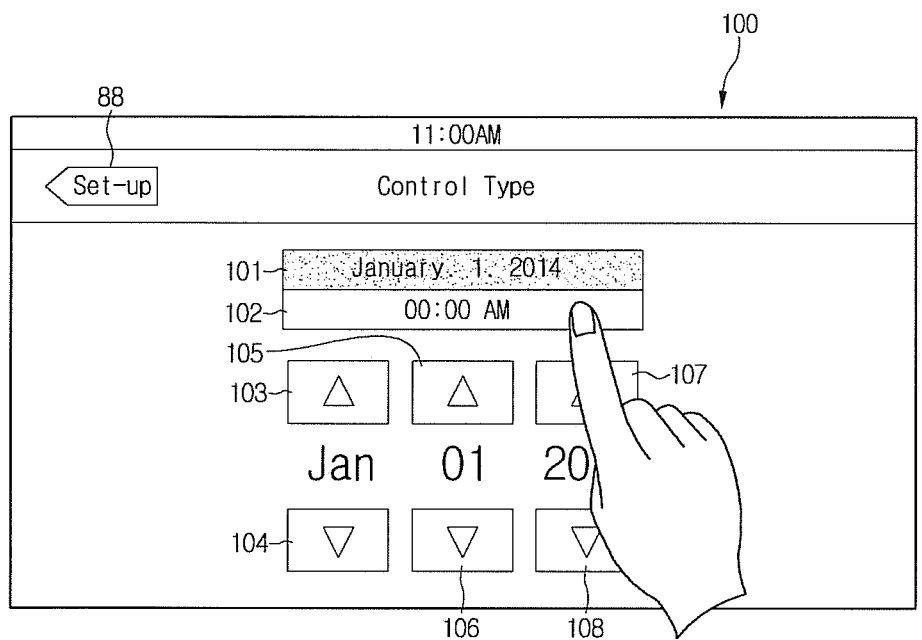

FIG. 9 illustrates a screen displayed when date and time button is selected on the screen of FIG. 6. When the date and time button is selected on the screen 67, the controller 4 may display a screen 100 for setting a date and a time as illustrated in FIG. 9.

The screen 100 may include a date button 101 and a time button 102. When the date button 102 is selected, the screen 100 may display month buttons 103 and 104 for selecting a month, day buttons 105 and 106 for selecting a day, and year buttons 107 and 108 for selecting a year. Of course, before the date button 102 is selected, the screen 100 may display the month buttons 103 and 104, the date buttons 105 and 106, and the year buttons 107 and 108. Each of the month buttons 103 and 104, the day buttons 105 and 106, and the year buttons 107 and 108 may include an up button and a down button.

Figure 10:
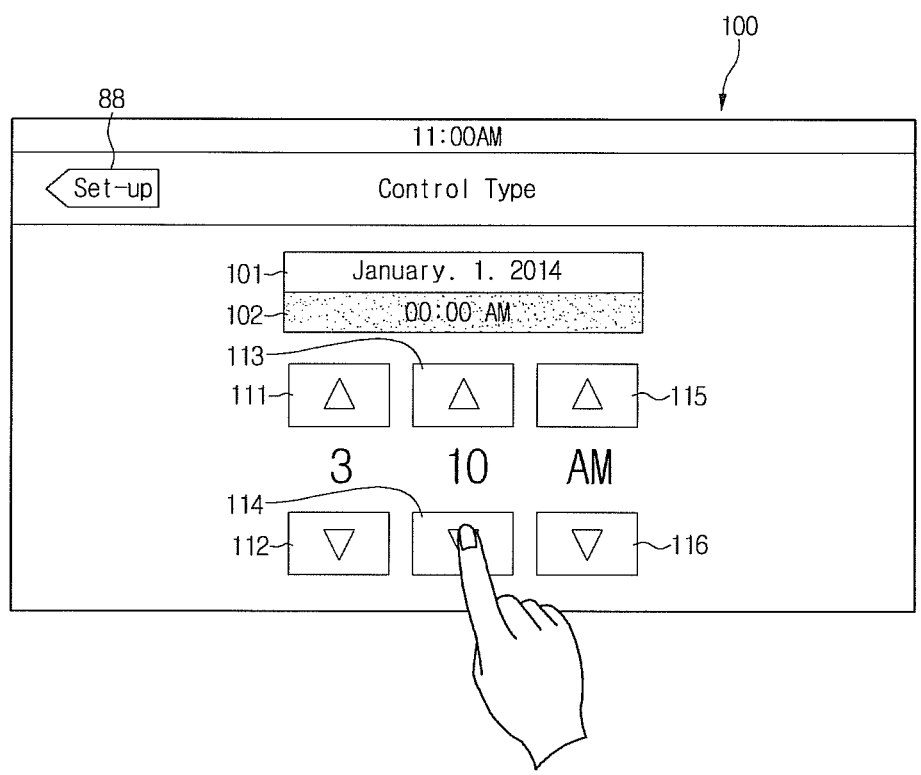

FIG. 10 illustrates a screen displayed when the time button is selected on the screen of FIG. 9. When the time button 102 is selected on the screen of FIG. 9, the screen 100 may display hour buttons 111 and 112, minute buttons 113 and 114, and AM/PM buttons 115 and 116 for AM/PM. Each of the hour buttons 111 and 112 and the minute buttons 113 and 114 may include an up button and a down button.

Figure 11:
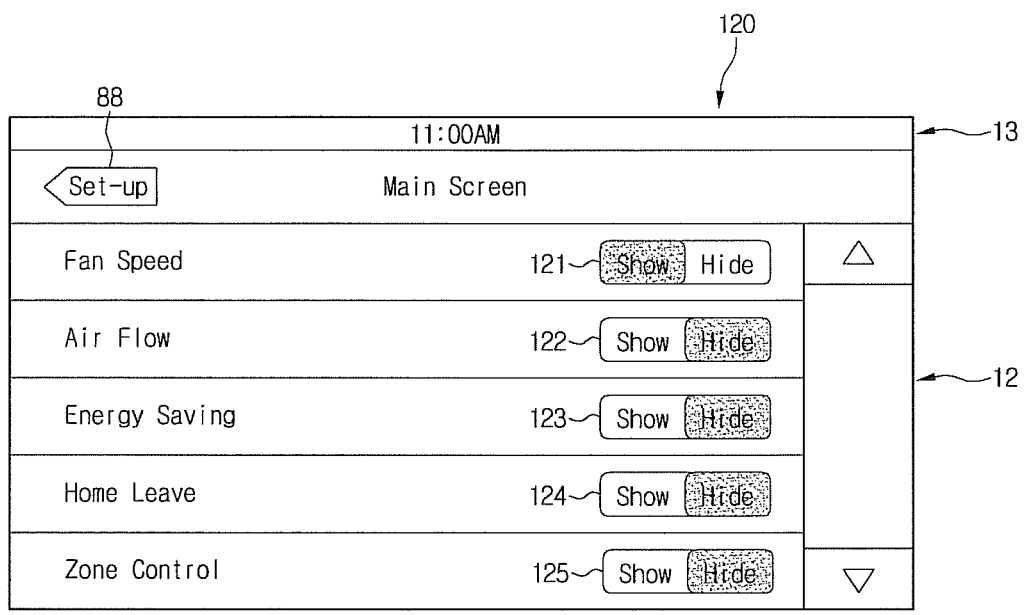

FIG. 11 illustrates a screen displayed when a main screen button is selected on the screen of FIG. 6. The screen in the first display mode is illustrated in FIG. 11.

When the main screen button 72 is selected on the screen 67, the controller 4 may display a screen 120 for selecting an item to be displayed on the main screen as illustrated in FIG. 11. The screen 120 may include a button 121 for selecting whether a fan speed is displayed, a button 122 for selecting whether an air volume is displayed, a button 123 for selecting whether energy saving is displayed, a button 124 for selecting whether home leave is displayed, and a button 125 for selecting whether a zone control is displayed.

Each of the buttons 121 to 125 may include a show button and a hide button. Alternatively, each of the buttons 121 to 125 may include one button which is slidable and showing or hiding may be selected by sliding the button. Alternatively, the screen 120 may further include a button (not illustrated) for selecting humidity.

Figure 12:
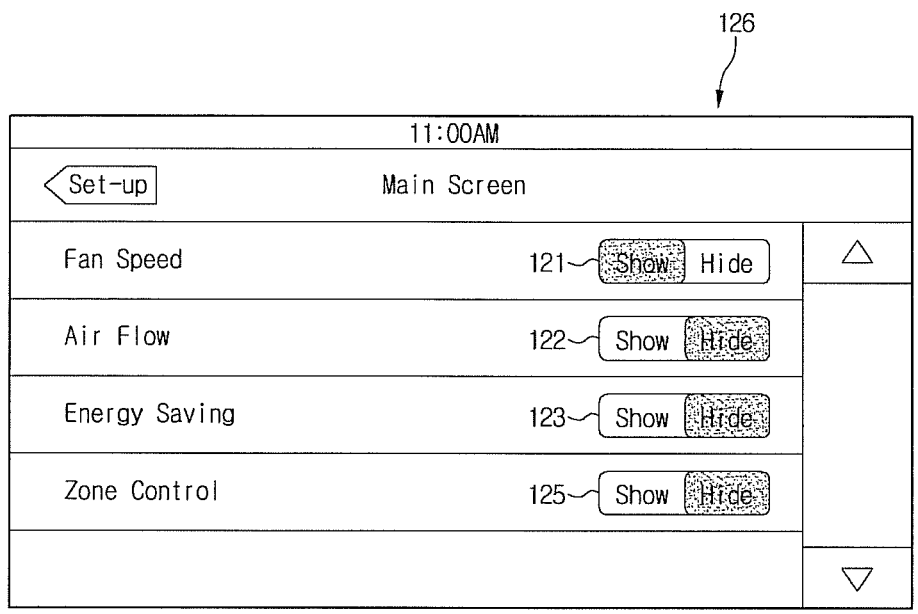

FIG. 12 illustrates a screen displayed when the main screen button is selected on the screen of FIG. 6. The screen in the second display mode is illustrated in FIG. 12.

When the main screen button 72 is selected on the screen 67 of FIG. 6, the controller 4 may display a screen 126 for selecting an item to be displayed on the main screen as illustrated in FIG. 12. The screen 126 may include a button 121 for selecting whether fan speed is displayed, a button 122 for selecting whether air volume is displayed, a button 124 for selecting whether energy saving is displayed, and a button 125 for selecting whether zone control is displayed.

FIGS. 13 to 19 illustrate examples of the home screen in which some items are hidden. A position of the hidden item is marked with dotted lines in FIGS. 13 to 19.

Figure 13:
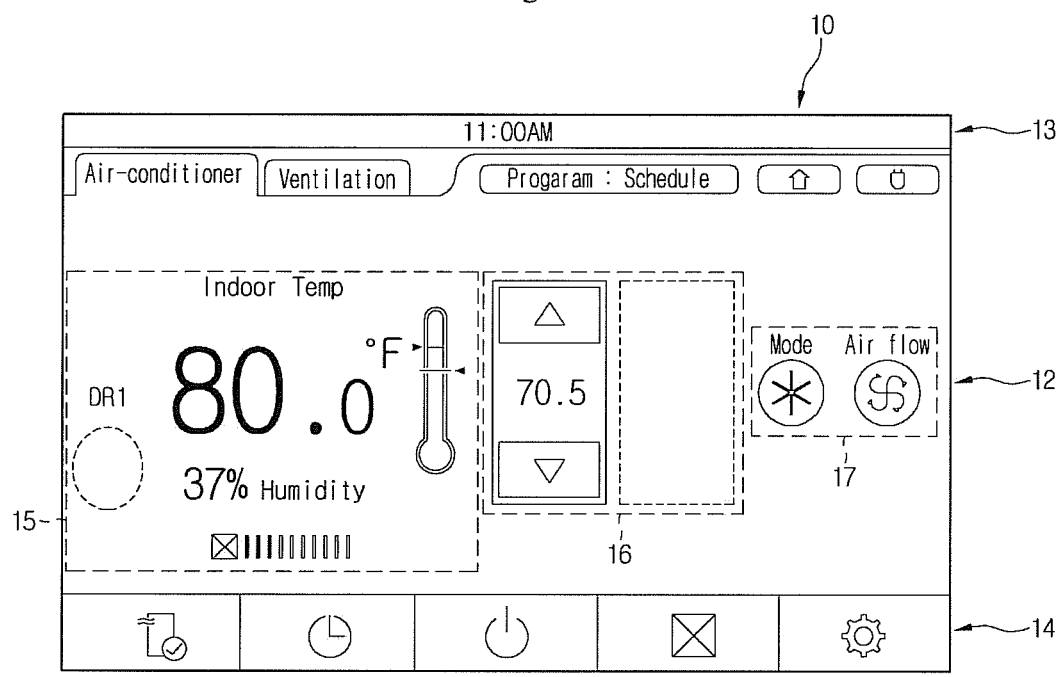
FIGS. 13 to 19 illustrate examples of the home screen in which some items are hidden on the HVAC controller according to embodiments.
Figure 14:
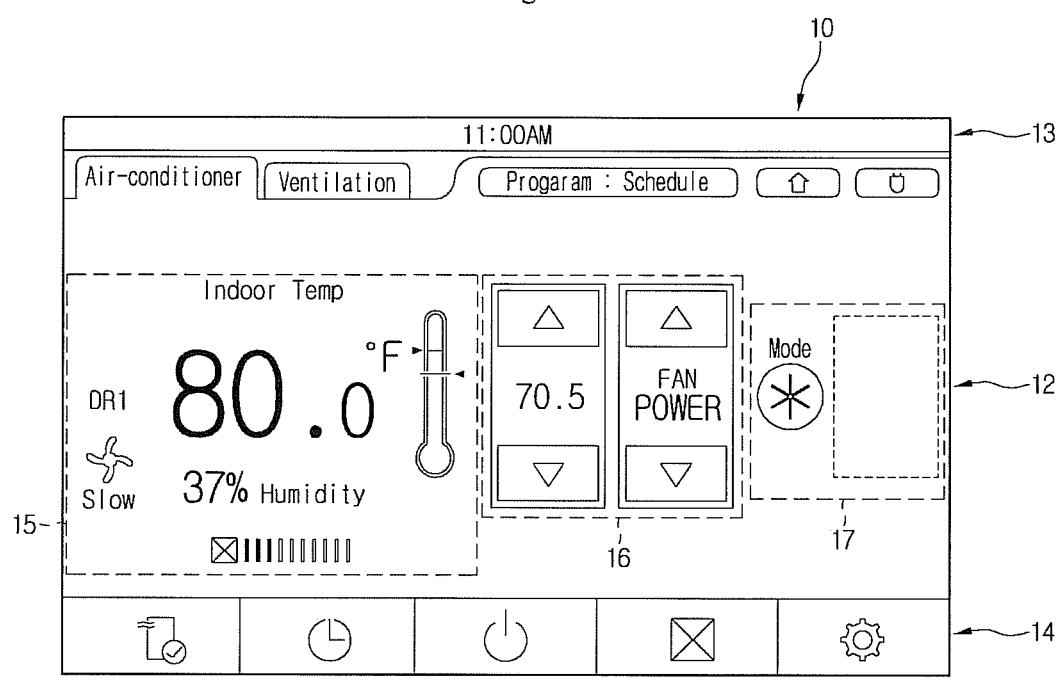
Figure 15:
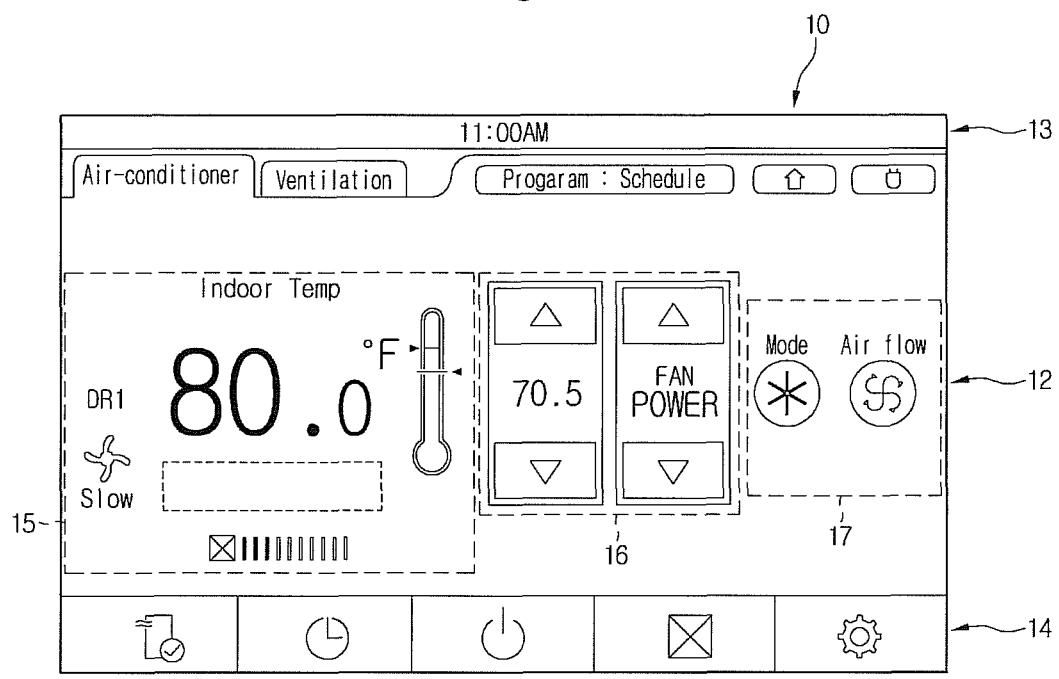

Referring to FIGS. 4 and 13, when hiding the fan speed is selected, the fan speed 27 is not displayed in the monitoring region 15 of the home screen 10 and the fan speed set-up block 34 may not be displayed in the main input region 16. Referring to FIGS. 4 and 14, when hiding the wind direction is selected, the wind direction button 42 may be displayed in the sub input region 17. Referring to FIGS. 4 and 15, when hiding the humidity is selected, the humidity 27 may not be displayed in the monitoring region 17 of the home screen 10.

In FIGS. 13 to 15, one item is not displayed on the home screen 10; however, when hiding a plurality of items is selected, the plurality of items may not be displayed on the home screen 10.

Figure 16:
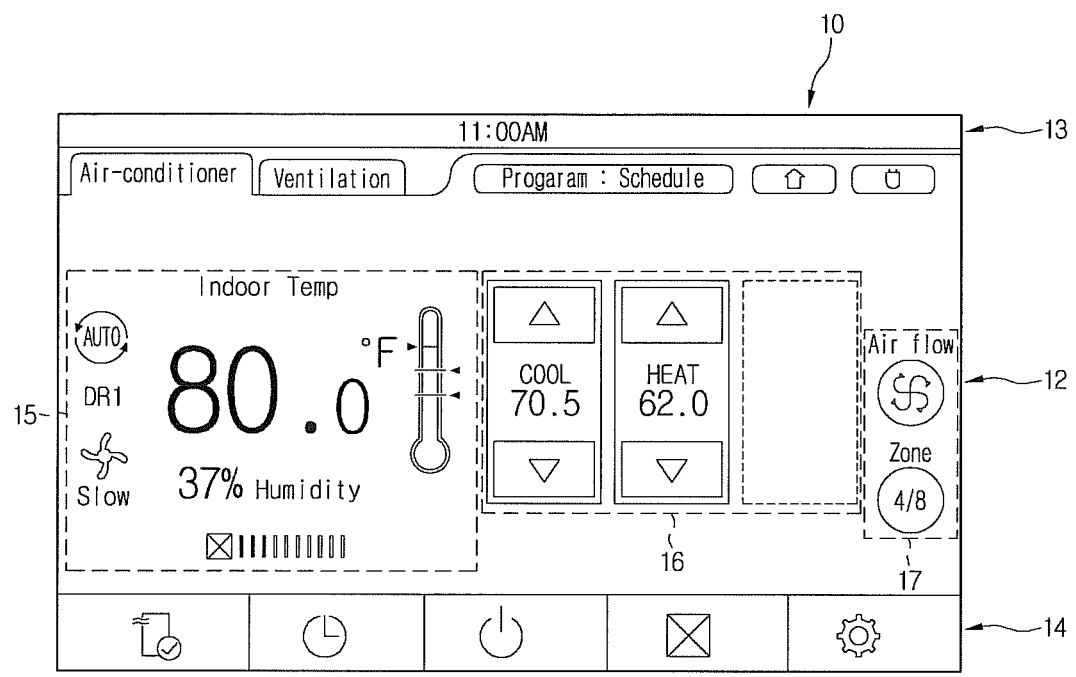
Figure 17:
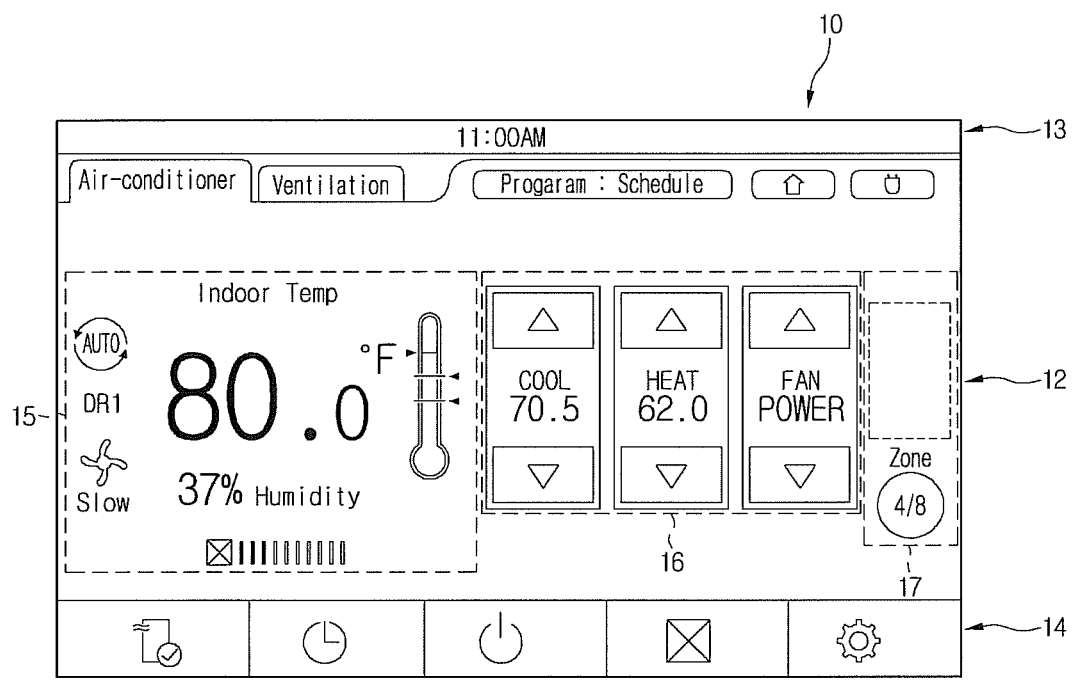
Figure 18:
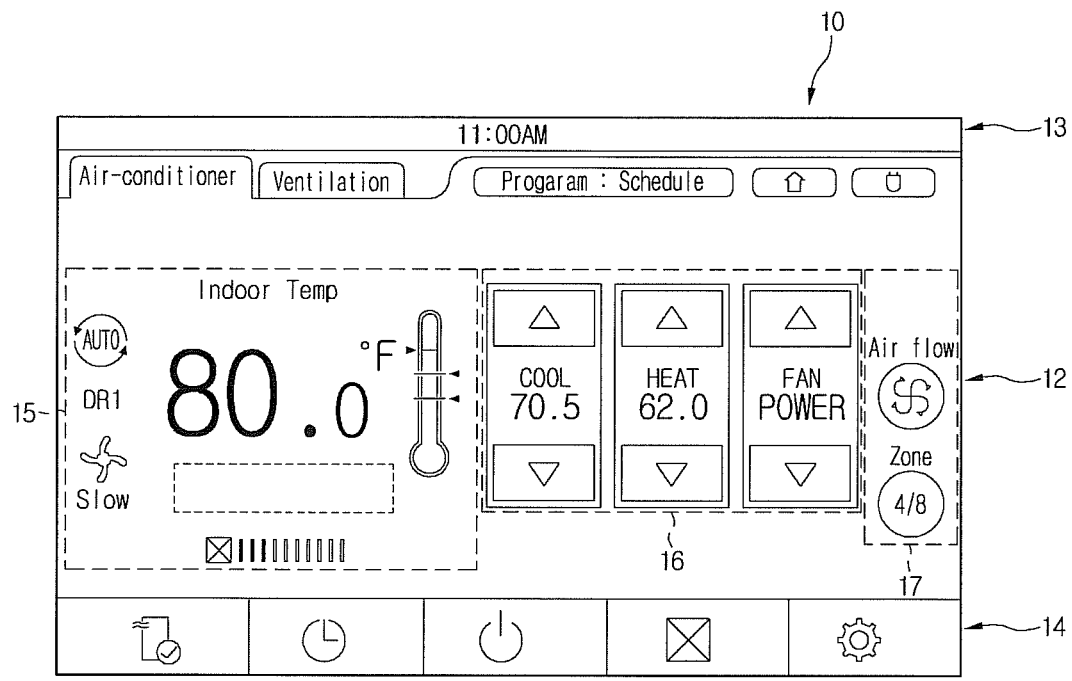
Figure 19:
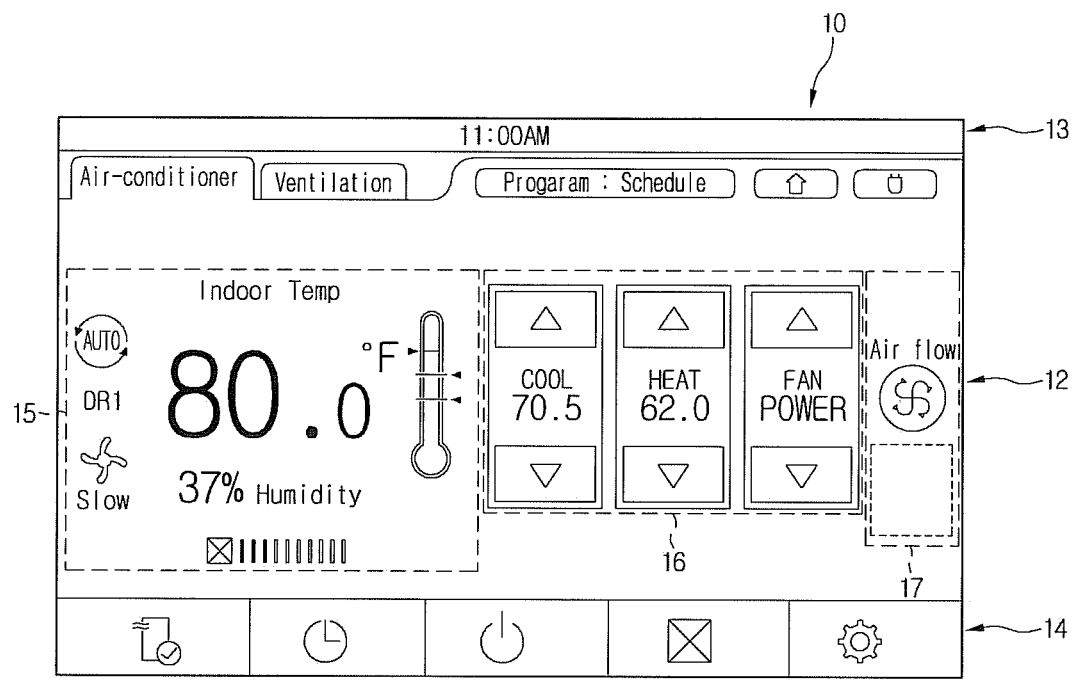

Referring to FIGS. 5 and 16, when hiding the fan speed is selected, the fan speed set-up block 34 may not be displayed in the main input region 16 of the home screen 10. Referring to FIGS. 5 and 17, when hiding the wind direction is selected, the wind direction button 42 may not be displayed in the sub input region 17. Referring to FIGS. 5 and 18, when hiding the humidity is selected, the humidity 27 may not be displayed in the monitoring region 17 of the home screen 10. Referring to FIGS. 5 and 19, when hiding the zone control is selected, the zone button 43 may not be displayed in the sub input region 17 of the home screen 10.

Figure 20:
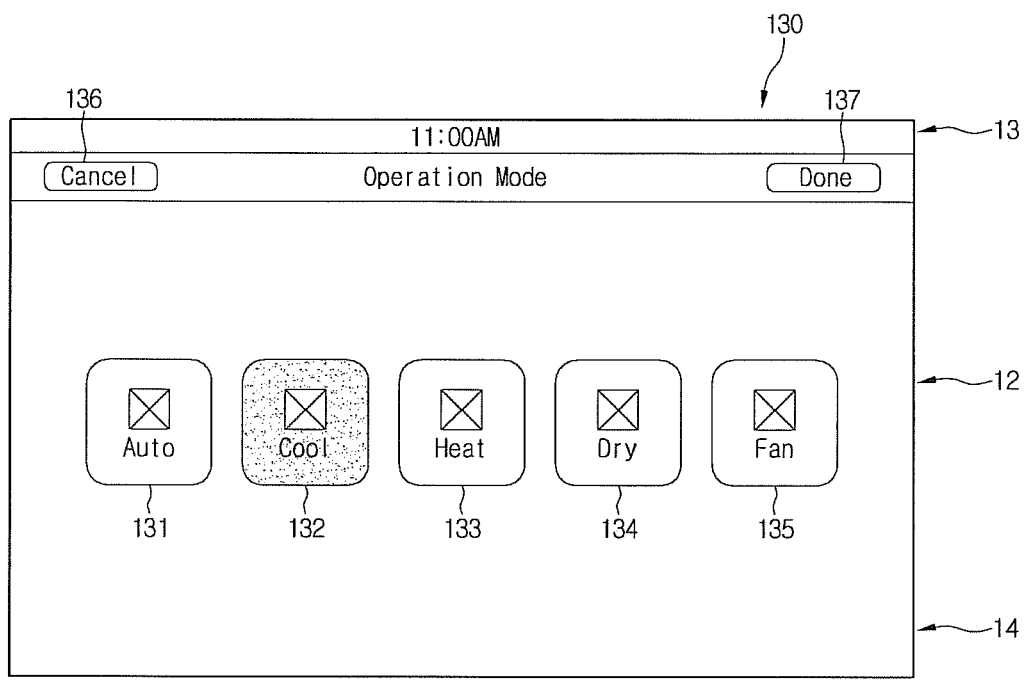
FIG. 20 illustrates a screen displayed when a mode button is selected on a screen of FIG. 4.

FIG. 20 illustrates a screen displayed when the mode button is selected on the screen of FIG. 4. Referring to FIG. 20, when the mode button 41 is selected on the screen of FIG. 4, the controller 4 may display a screen 130 for selecting operation modes of one or more components of the HVAC system on the touch screen display 3.

The screen 130 may include an automatic button 131, a cooling button 132, a heating button 133, a dehumidification button 134, and a blowing button 135. Further, the screen 130 may further include a cancel button 136 and a done button 137.

The controller 4 may change a number of buttons displayed on the screen 130. That is, the controller 4 may display buttons for selecting the mode on the screen 130 to correspond to a number of modes in which one or more components of the HVAC system are operable.

An array of the buttons may be changed depending on the number of buttons displayed on the screen 130. In this case, an array method of the buttons when the buttons are odd is different from an array method of the buttons when the buttons are even.

For example, when a plurality of buttons to be displayed is an even number, the plurality of option buttons may be vertically oriented in a plurality of rows, in which as button may be placed in each row. In addition, the plurality of rows may be an even number.

When the plurality of buttons to be displayed is an odd number, the plurality of option buttons may be vertically oriented in a plurality of rows, in which a button may be placed in each row. In addition, the plurality of rows may be an odd number.

Figure 21:
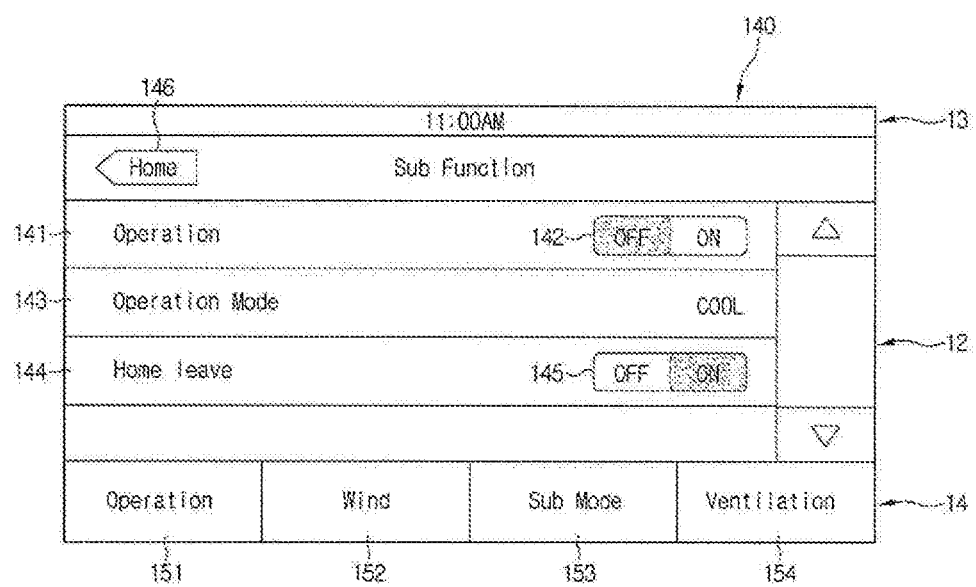
FIG. 21 illustrates a screen displayed when a main button is selected on the screen of FIG. 4.

FIG. 21 illustrates a screen displayed when a main button is selected on the screen of FIG. 4. Referring to FIG. 21, when the main button 61 is selected on the home screen 10 of FIG. 4, the controller 4 may display a screen 140 for selecting a sub function on the touch screen display 3.

The screen 140 may include a first region 12, a second region 13, and a third region 14. The first region 12 may include an operation on/off button 141 for selecting on/off of one or more components of the HVAC system, an operation mode button 143 for selecting an operation mode, and a home leave button 144 for selecting home leave.

The operation on/off button 141 may include a button 142 for selecting on/off. For example, the button 142 may include an on button and an off button.

When the operation mode button 143 is selected, the controller 4 may display the screen 130 of FIG. 20 on the touch screen display 3. The operation mode button 140 may include information on the selected mode.

The home leave button 144 may include a button 145 for selecting on/off. For example, the button 145 may include an on button and an off button.

Further, the first region 12 may include a home button 146. When the home button 146 is selected, the controller 4 may display the home screen 10 of FIG. 4 or 5 on the touch screen display 3.

The third region 14 may include an operation button 151, a wind button 152, a sub mode button 153, and a ventilation button 154.

Figure 22:
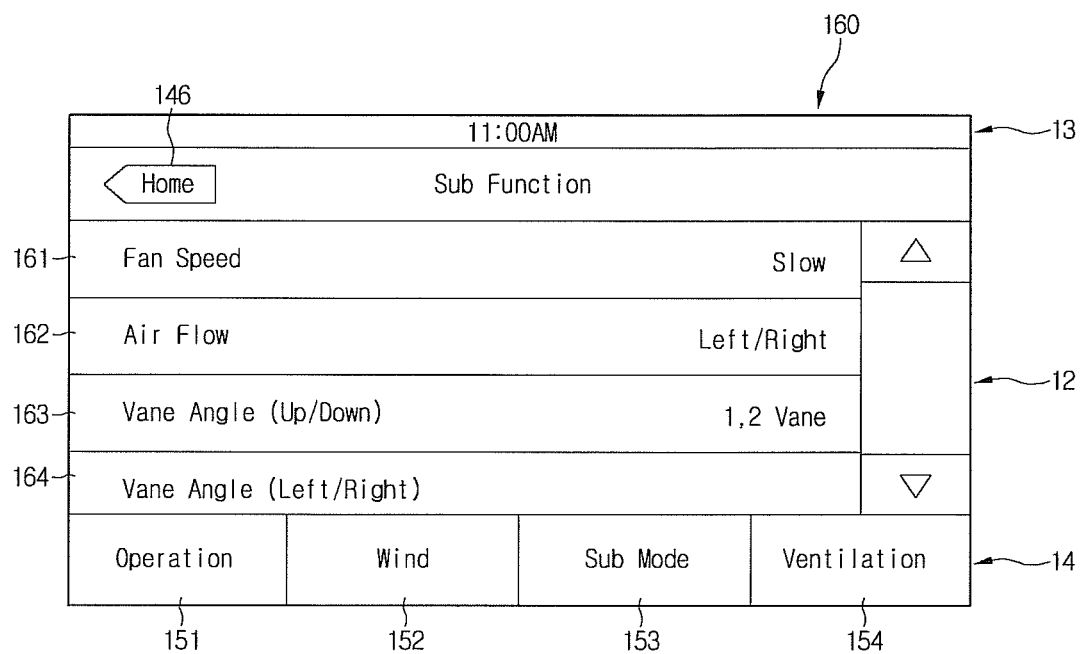
FIG. 22 illustrates a screen displayed when a wind button is selected on the screen of FIG. 21.

FIG. 22 illustrates a screen displayed when a wind button is selected on the screen of FIG. 21. Referring to FIG. 22, when the wind button 152 is selected on the screen 140 of FIG. 21, the controller 21 mat display a screen 160 for setting a parameter associated with a wind on the touch screen display 3.

The screen 160 may include a fan speed button 161 for setting fan speed, a wind direction button 162 for setting wind direction, a vertical vane angle button 162 for setting vane angle, and a horizontal vane angle button 163 for setting a horizontal vane angle. Further, the screen 160 may include the home button 146.

The fan speed button 161 may include set fan speed information, and the wind direction button 162 may include set wind direction information.

Figure 23:
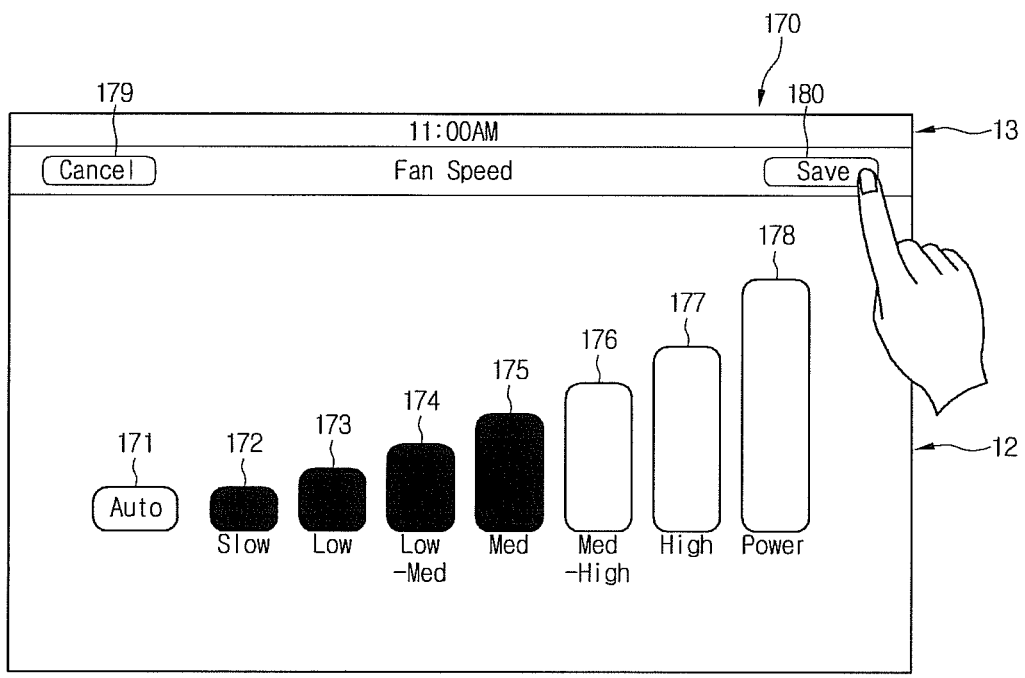
FIG. 23 illustrates a screen displayed when a fan speed button is selected in FIG. 22.

FIG. 23 illustrates a screen displayed when a fan speed button is selected in FIG. 22. Referring to FIG. 23, when the fan speed button 161 is selected on the screen 160 of FIG. 22, the controller 4 may display a screen 170 for setting the fan speed on the touch screen display 3.

The screen 170 may include an automatic button 171, a slow button 172, a low button 173, a low-medium (mid) button 174, a medium (med) button 175, a medium (med)-high button 176, a fast button 177, and a power button 178. The screen 170 may further include a cancel button 179 and a save button 180. The controller 4 may change a number of buttons displayed on the screen 170 depending on a number of fan speeds which may be selected in one or more components of the HVAC system.

When the save button 180 is selected after a specific button is selected, the fan speed 27 of the monitoring region 15 and the fan speed information of the fan speed set-up block 34 of the main input region 16 may be changed on the home screen 10 of FIG. 4.

When the save button 180 or the cancel button 179 is selected on the screen 170, the controller 4 may display the home screen 10 of FIG. 4 or 5 or the screen 160 of FIG. 22 on the touch screen display 3.

Alternatively, the screen 170 may include two set-up buttons for selecting fan speeds of a plurality of steps. At least one of the fan speeds of the plurality of steps may be selected using two set-up buttons.

Figure 24:
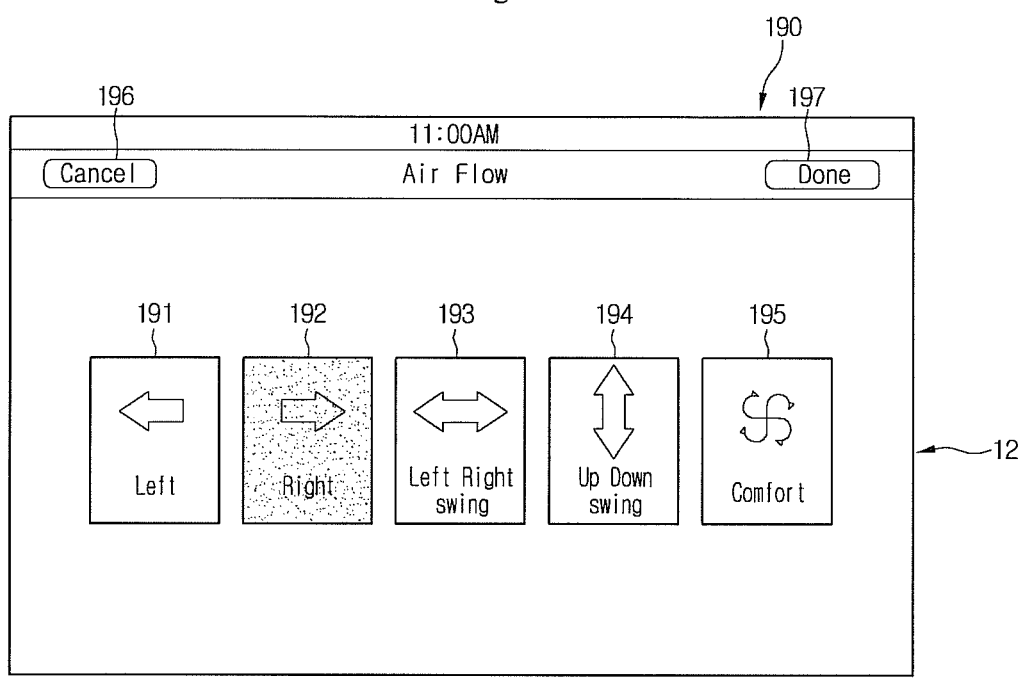
FIG. 24 illustrates a screen displayed when a wind direction button is selected in FIG. 22.

FIG. 24 illustrates a screen displayed when a wind direction button is selected in FIG. 22. Referring to FIG. 24, when the wind direction button 162 is selected on the screen 160 of FIG. 22, the controller 4 may display a screen 190 for setting the wind direction on the touch screen display 3. Alternatively, when the wind direction button 42 is selected on the home screen 10 of FIG. 4, the controller 4 may display the screen 190 for setting the wind direction on the touch screen display 3.

The screen 190 may include a left button 191, a right button 192, a left-right swing button 193, an up-down swing button 194, and a comfort button 195. Further, the screen 190 may include a cancel button 196 and a done button 197. The controller 4 may change a number of buttons displayed on the screen 190 depending on a number of wind directions which may be selected in one or more components of the HVAC system.

When the done button 197 is selected after a specific button is selected, an image of the wind direction 42 of the sub input region 17 may be changed on the home screen of FIG. 4.

Figure 25:
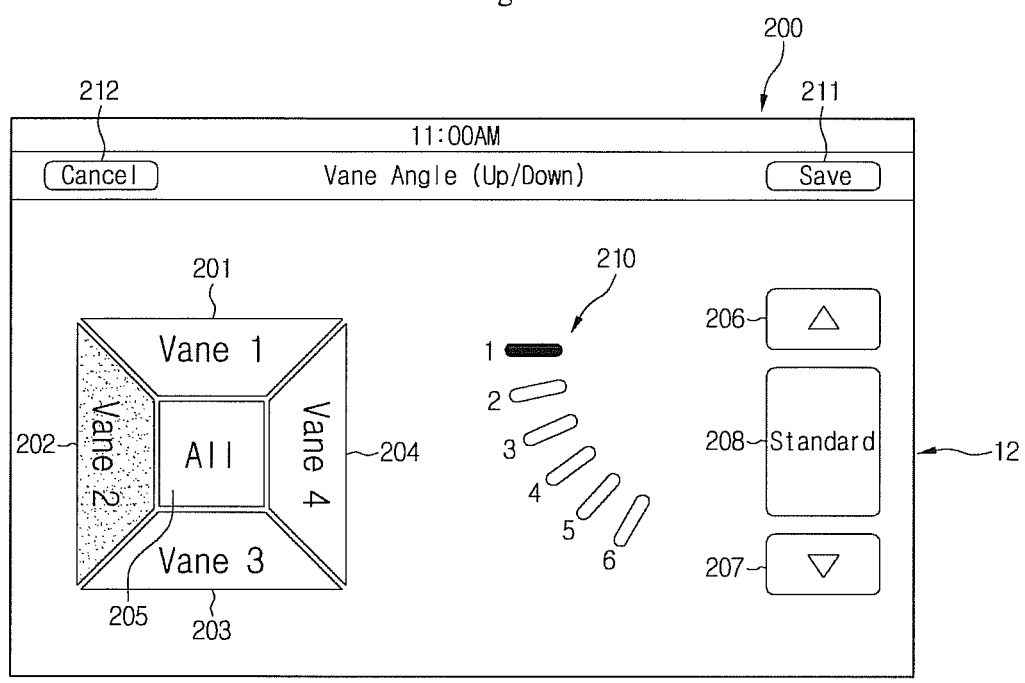
FIG. 25 illustrates a screen displayed when a vertical vane angle button is selected in FIG. 22.

FIG. 25 illustrates a screen displayed when a vertical vane angle button is selected in FIG. 22. Referring to FIG. 25, when the vertical vane angle button 163 is selected on the screen 160 of FIG. 22, the controller 4 may display a screen 200 for setting the vertical vane angle on the touch screen display 3.

The screen 200 may include a first vane button 201, a second vane button 202, a third vane button 203, and a fourth vane button 204 for selecting a plurality of vanes, respectively, and an all button 205 for selecting all of the plurality of vanes. Accordingly, the user may individually set a vertical angle for each vane and set the vane angles simultaneously by selecting two or more vane buttons.

The controller 4 may change a number of vane buttons displayed on the screen 200 depending on a number of vanes for which vertical angles may be controlled in one or more components of the HVAC system. Alternatively, all vane buttons may be displayed with the number of vanes of which angles are controllable, in which only vane buttons corresponding to the vanes for which angles are controllable may be activated.

The screen 200 may include an up button 206 and a down button 207 for setting an angle of a selected vane, and a standard button 208 for selecting a standard angle. The standard angle may be automatically selected in a range of, for example, 30 to 60°. For example, the vane angle may be set by a unit of 15° using the up button 206 and the down button 207; however, embodiments are not limited thereto.

The screen 200 may further include an image 210 for the user to intuitively verify the selected vane angle. The image 210 may include a plurality of bars which is placed at different angles. In this case, the plurality of bars may be placed at a predetermined interval within a range of approximately 90° and a color of a bar corresponding to the selected angle may be different from colors of remaining bars.

The screen 200 may further include a cancel button 212 and a save button 211.

Figure 26:
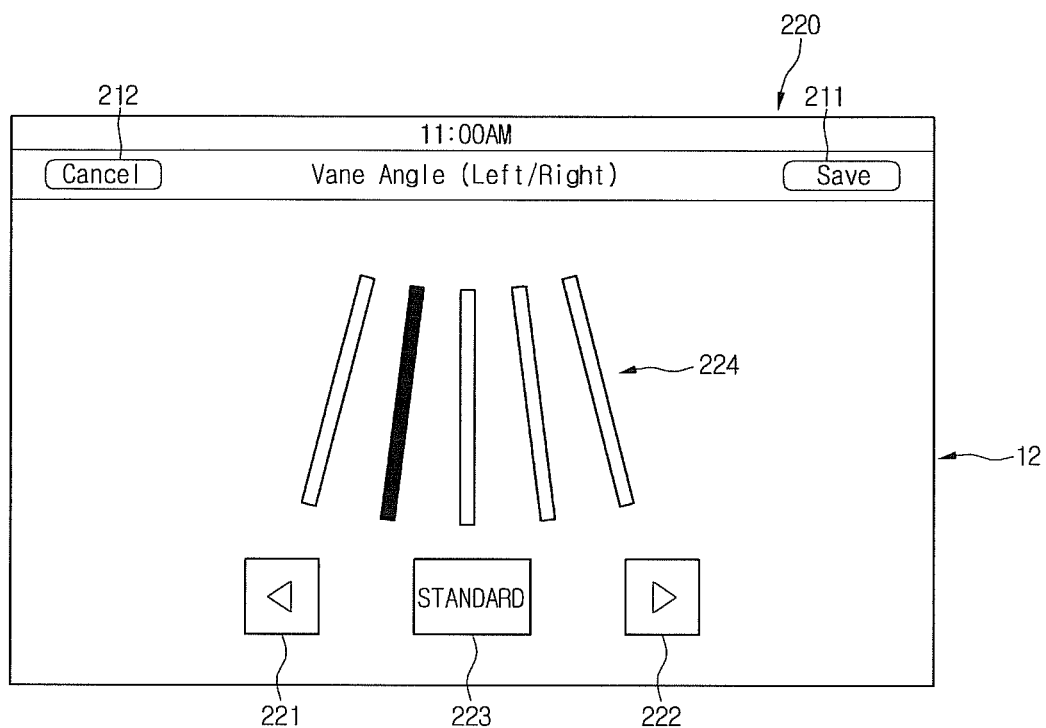
FIG. 26 illustrates a screen displayed when a horizontal vane angle button is selected in FIG. 22.

FIG. 26 illustrates a screen displayed when a horizontal vane angle button is selected in FIG. 22. Referring to FIG. 26, when the horizontal vane angle button 164 is selected on the screen 160 of FIG. 22, the controller 4 may display a screen 220 for setting the horizontal vane angle on the touch screen display 3.

The screen 200 may include a left button 221 and a right button 222 for selecting the angle of the selected vane, and a standard button 223 for selecting a standard angle. Further, the screen 220 may further include an image 224 for the user to intuitively verify the selected vane angle. The image 224 may include a plurality of vertical bars which is placed at different angles. In this case, the plurality of vertical bars may be placed at a predetermined interval within a predetermined range and a color of a vertical bar corresponding to the selected angle may be different from colors of remaining vertical bars.

The screen 200 may further include a cancel button 212 and a save button 211.

Figure 27:
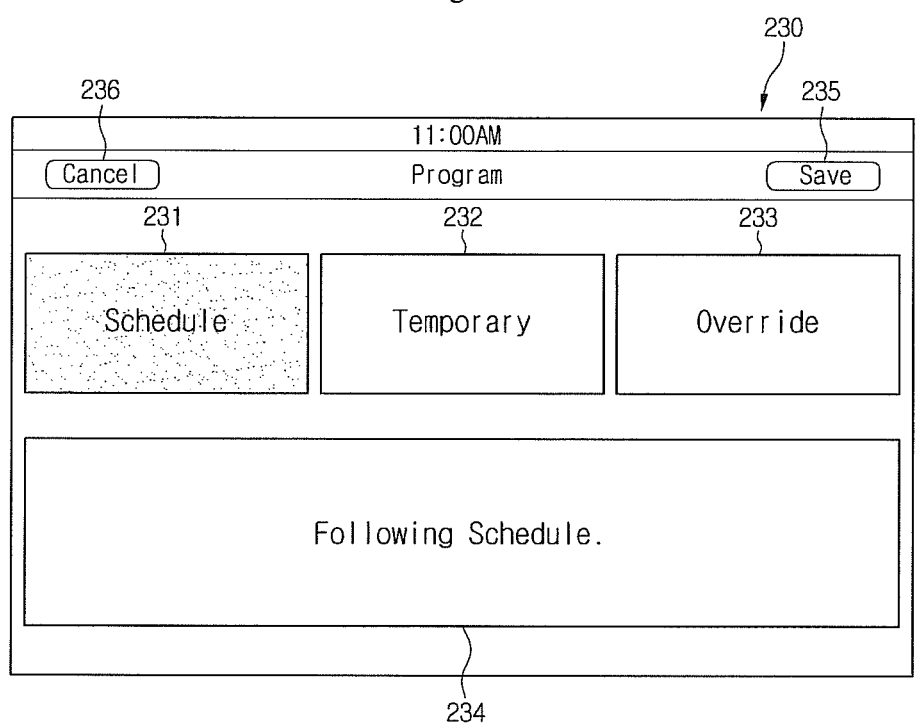
FIG. 27 illustrates a screen displayed when a program button is selected on the home screen of FIG. 4.

FIG. 27 illustrates a screen displayed when a program button is selected on the home screen of FIG. 4. Referring to FIG. 27, when a program button 53 is selected on the home screen 10 of FIG. 4, the controller 4 may display a screen 240 for selecting an operation program on the touch screen display 3.

The screen 240 may include a schedule button 231 for following a set schedule, a temporary button 232 for arbitrary control by the user, and an override button 233 for temporarily switching an occupied or unoccupied state by the schedule. Further, the screen 240 may further include a cancel button 236 and a done button 235.

The screen 240 may display a text message 234 when the schedule button 231 is selected. The text message 234 may be, for example, "following schedule".

Figure 28:
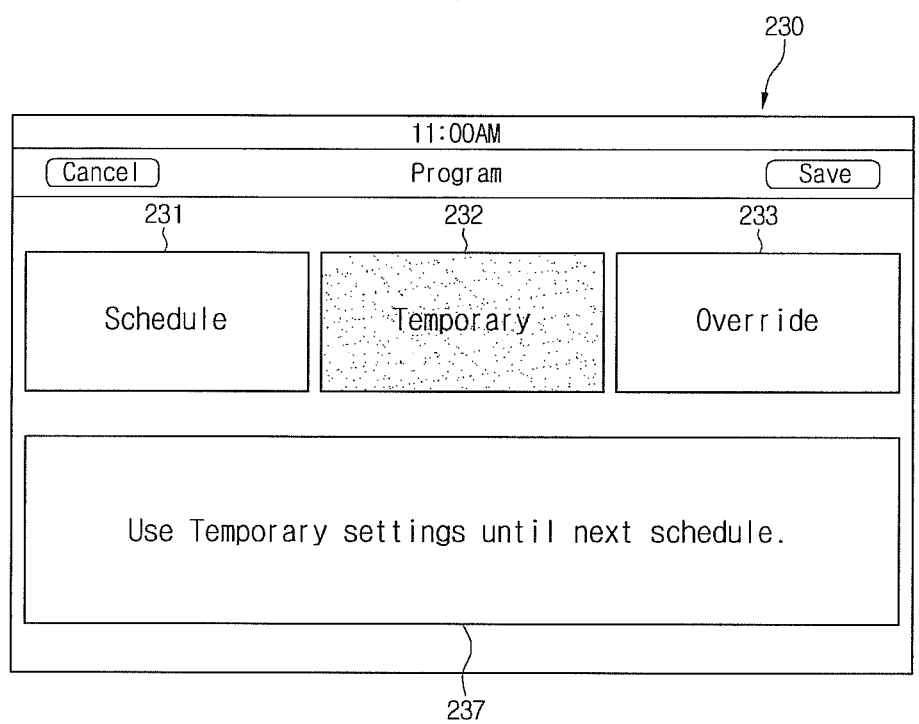
FIG. 28 illustrates a screen displayed when a temporary button is selected on the screen of FIG. 27.

FIG. 28 illustrates a screen displayed when a temporary button is selected on a screen of FIG. 27. Referring to FIG. 28, when the temporary button 232 is selected on the screen 230 of FIG. 27, the screen 230 may display a text message 237. The text message 237 may be "use temporary settings next schedule".

The controller 4 may control one or more components of the HVAC system by using temporary settings until a next schedule. The temporary settings may be input by the user.

Figure 29:
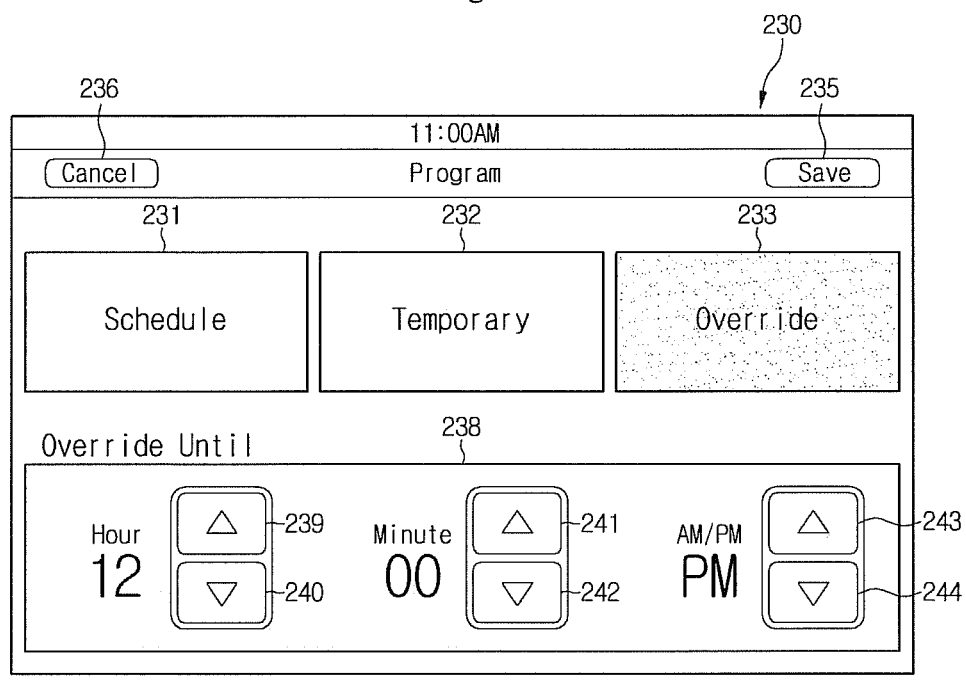
FIG. 29 illustrates a screen displayed when an override button is selected on the screen of FIG. 28.

FIG. 29 illustrates a screen displayed when an override button is selected on the screen of FIG. 28. Referring to FIG. 29, when the override button 234 is selected on the screen 230 of FIG. 28, the screen 230 may display an hour set-up block 238 for setting a state switching done time.

The hour set-up block 238 may include hour buttons 239 and 240 for selecting an hour, minute buttons 241 and 242 for selecting a minute, and AM/PM button 243 and 244 for selecting AM/PM. When the state switching done time is input in the time set-up block 238 while one or more components of the HVAC system are subjected to an occupied operation, the controller 4 may allow the one or more components of the HVAC system to be subjected to an unoccupied operation and vice versa. However, when an event start schedule is reached earlier before the state switching done time is reached, the controller 4 may control the one or more components of the HVAC system according to the event start schedule. When the one or more components of the HVAC system is operated according to the schedule, the controller 4 may activate the override button 234.

Figure 30:
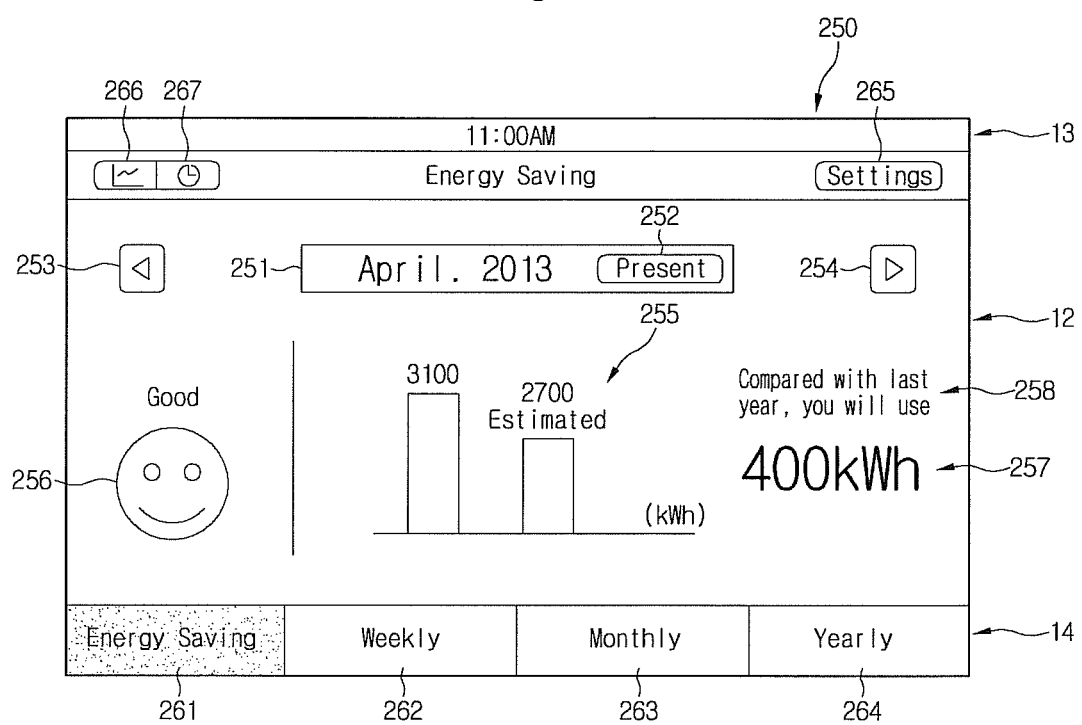
FIGS. 30 to 41 illustrate examples of screens for monitoring an energy usage amount.
Figure 31:
Figure 31:
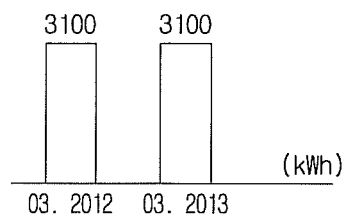
Figure 31:
Figure 31:
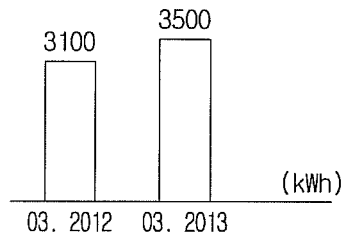

FIGS. 30 to 41 illustrate examples of screens for monitoring an energy usage amount. FIG. 30 illustrates a screen displayed when an energy button 55 is selected on the screen of FIG. 4 or 5. FIG. 31 illustrates various images which may be displayed on a screen for monitoring.

When the energy button 55 is selected on the screen of FIG. 4 or 5, the controller 4 may display the screen 250 for monitoring the energy usage amount on the touch screen display 3. That is, the controller 4 may display the screen 250 for monitoring the energy usage amount on the touch screen display 3 when a command for verifying the energy usage amount is received.

The screen 250 may include a first region 12, a second region 13, and a third region 14. The third region 14 may include a plurality of buttons for verifying energy usage amount information. The third region 14 may include a weekly button 262, a monthly button 263, and a yearly button 264. Therefore, the third region 14 may be called a button region on the screen 250. Further, the third region 13 may further include an energy saving button 261. Therefore, the third region 14 may be called a selection region for selecting information to be displayed.

The first region 12 may display energy usage amount information corresponding to a selected button among buttons 261 to 263 of the third region 14. Therefore, the first region 12 may be called a display region for displaying information.

However, while the buttons 261 to 263 are not selected, the screen 250 may display one or more images 255 and 256 for comparing an energy usage amount of a present month and an energy usage amount of the same method of a previous year, and month information 251.

That is, the controller 4 may acquire energy usage amounts of one or more components of the HVAC system during a first period and acquire energy usage amounts of one or more components of the HVAC system during a second period which is a previous period to the first period. In addition, the controller 4 may compare the respective acquired energy usage amounts, and generate the result information to display the generated result information on the screen 250. Further, the controller 4 may display an energy usage amount during a predetermined period on the screen 250 by acquiring the energy usage amount information.

The image 255 may include a plurality of bar graphs showing the energy usage amount during the first period and the energy usage amount during the second period, at the same time. The plurality of respective bar graphs may display the energy usage amounts with relative lengths or heights. Accordingly, the user may intuitively compare the energy usage amounts during two periods.

Alternatively, the image 255 may include a plurality of bar graphs showing a target energy usage amount and the energy usage amount during the first period. The target energy usage amount may be set by the user.

The image 256 (representing the result information) may be an icon. A shape, a form, or a color of the icon may be changed depending on a result of the comparison of the energy usage amounts. For example, when the energy usage amount during the first period is smaller than the energy usage amount during the second period by a predetermined amount or more, the icon may be a smiling face shape. In contrast, when the energy usage amount during the first period is larger than the energy usage amount during the second period by a predetermined amount or more, the icon may be a frowning face shape.

The first region 12 may include change buttons 253 and 254 for changing a month (period) to be verified. The month information 251 may display a month selected by the change buttons 253 and 254. In addition, the month information 251 may include a present button 252 for selecting a present month.

The first region 12 may display a difference value 257 (representing the result information) between the energy usage amount during the first period and the energy usage amount during the second period by numerical figures. Further, the first region 12 may display the comparison result of the energy usage amount during the first period and the energy usage amount during the second period by a text 258.

In this case, a color of the image 256, a color of the bar graph displaying the energy usage amount during the first period, and a color of the numerical figure displaying the difference value 257 in the energy usage amount may be the same as each other.

The first region 12 may further include an energy usage amount button 266 selected for viewing the energy usage amount and a usage time button 267 selected for viewing a used time. Further, the first region 12 may include a set-up button 265.

Figure 32:
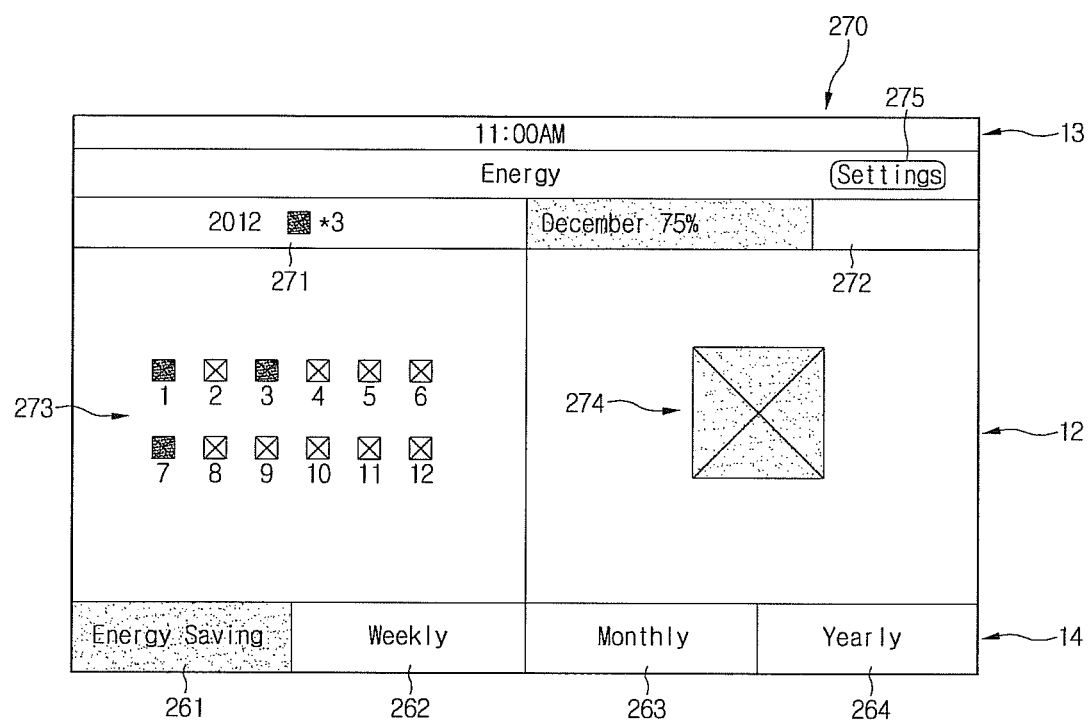

FIG. 32 is another example of a screen for monitoring the energy usage amount. Referring to FIG. 32, when the energy button 55 is selected on the screen of FIG. 4 or 5, the controller 4 may display a screen 270 for monitoring the energy usage amount on the touch screen display 3.

The screen 270 may include a first region 12, a second region 13, and a third region 14. The third region 14 may include a plurality of buttons for verifying energy usage amount information. The third region 14 may include a weekly button 262, a monthly button 263, and a yearly button 264. Therefore, the third region may be called a button region on the screen 270. Further, the third region 13 may further include an energy saving button 261.

The first region 12 may display energy usage amount information corresponding to a selected button among buttons 261 to 263 of the third region 14. However, while the buttons 261 to 263 are not selected, the screen 270 may display energy usage amount information 272 or 274 of a present month. The energy usage amount information 272 or 274 may be a bar graph 272 or an icon 274; however, embodiments are not limited thereto.

Further, the screen 270 may display monitoring information 273 for each month (second period) that belongs to a present year (first period). For example, the monitoring information 273 may include 12 divided months. A color of each monitoring information 273 may be changed according to the energy usage amount and a reference usage amount. In this case, the reference usage amount may be a manually or automatically set target energy usage amount or an energy usage amount in the same month of a previous year.

The monitoring information 273 is result information generated when the controller 4 compares the energy usage amounts of one or more components of the HVAC system and the reference usage amount. The reference usage amount may be a usage amount set by the user or an energy usage amount in each month of a previous year.

Further, the screen 270 may display number information 271 of a month among months that belong to a preset year, in which the energy usage amount is smaller than the reference usage amount. For example, it is illustrated that energy usage amounts in three months of 2012 are smaller than the reference usage amount.

Further, the screen 270 may include a set-up button 275.

Figure 33:
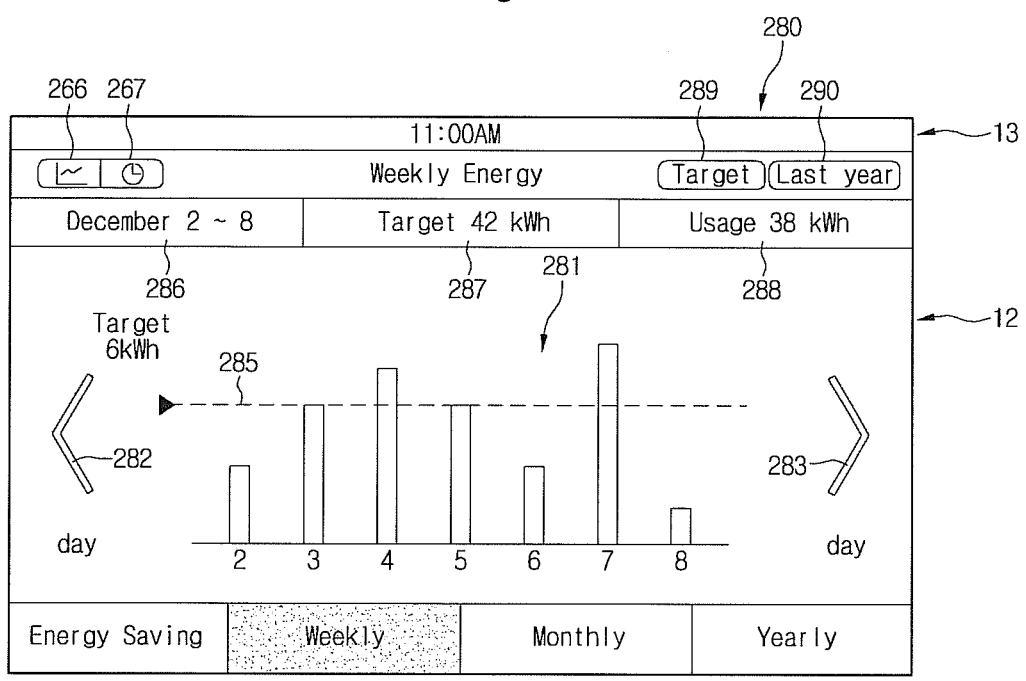

FIG. 33 illustrates a screen displayed when a weekly button is selected on the screen of FIG. 30. Referring to FIG. 33, when the weekly button 262 is selected on the screen 250 of FIG. 30, the controller 4 may display a screen 280 for showing an energy usage amount during one week on the touch screen display 3. The screen 280 may display a weekly usage amount image 281 showing the energy usage amount during one week for each day and a display line 285 displaying a daily target usage amount.

The weekly usage amount image 281 may include a plurality of bar graphs displaying an energy usage amount for each day or date. The bar graphs may be vertically oriented, and a height, length, or size of the bar graphs may be changed according to the energy usage amount for each day. The display line 285 may be a horizontal line. The color of the bar graphs may be changed according to a result of comparison of the daily target usage amount and the energy usage amount for each day. That is, the controller 4 may compare the energy usage amount for each day and the daily target usage amount, and may differently display the color, the size, or the length of the energy usage amount for each day according to the comparison result.

The screen 250 may display a plurality of energy usage amounts for each day. Therefore, the screen 250 may display energy usage amounts of a plurality of respective sections, and the weekly button 262, the monthly button 263, and the yearly button 264 may be buttons for changing the length of the section.

The screen 280 may include change buttons 282 and 283 for changing a week or a day to be displayed. For example, when a right button 283 is selected, the week may be changed or bar graphs of two days may disappear and bar graphs of nine days may appear.

Further, the screen 280 may include information 286 displaying the week, a weekly target energy usage amount 287, and a weekly actual energy usage amount 288. The information is text information (representing a concept including numerical figures). The screen 280 may further include an energy usage amount button 266 selected for viewing the energy usage amount and a usage time button 267 selected for viewing a usage time. The screen 280 may further include a target button 289 for selecting a screen for comparing a target usage amount and an actual accumulated usage amount, and a last year button 290 for comparing a past usage amount and the actual accumulated usage amount. For example, a screen displayed when the target button 289 is selected is illustrated in FIG. 33.

Figure 34:
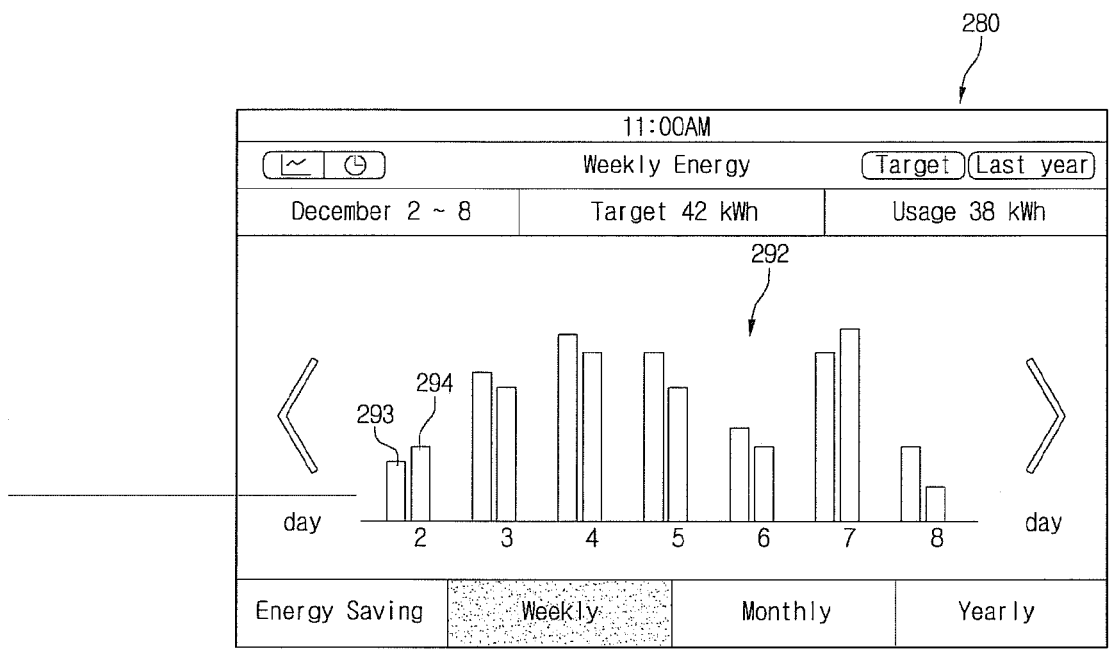

FIG. 34 illustrates a screen displayed when a last year button is selected on the screen of FIG. 33. Referring to FIG. 34, when the last year button 290 is selected on the screen 280 of FIG. 33, the controller 4 may display an image 292 for showing a preset energy usage amount and a last-year energy usage amount on the screen 280 at the same time.

The image 292 may include a plurality of present bar graphs 294 displaying the energy usage amount for each day and a plurality of past bar graphs 293 displaying an energy usage amount in the same week of a previous year. That is, both the present bar graph 294 and the past bar graph 293 may be displayed for each day. In this case, the display line 285 displaying the target usage amount may disappear on the screen 280 of FIG. 34.

Figure 35:
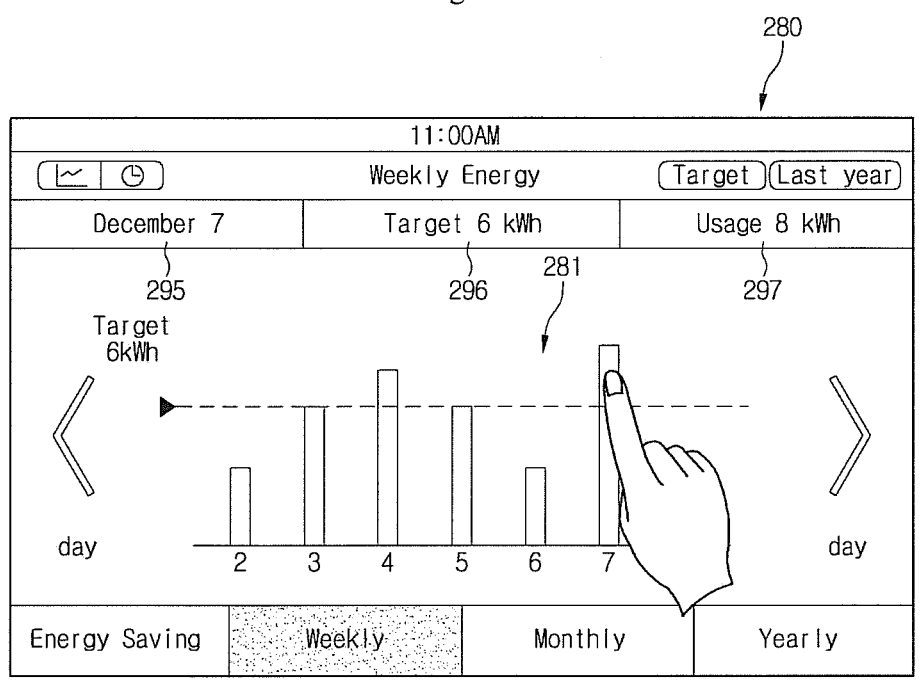

FIG. 35 illustrates a screen displayed when a specific day is touched on the screen displayed in FIG. 33. As the first image 281 is an image for comparing the target usage amount and the actual accumulated usage amount on the screen of FIG. 33, the user may touch the specific day on the screen 280 in order to accurately verify the energy usage amount of the specific day.

When the specific day (for example, a seventh day) is selected on the screen 280 displayed in FIG. 33, the screen 280 may display a selected day 295, a target energy usage amount 296, and an actual accumulated usage amount 297 of the selected day.

In FIGS. 33 to 35, the screen 280 may display the images 281 and 292 including the bar graphs, but alternatively, may display an image including a broken-line graph. Further, in FIG. 33, if the target usage amount and the energy usage amount for each day during a specific period may be intuitively compared with each other, a type of the image is not limited. In FIG. 34, if a past energy usage amount and the energy usage amount for each day during the specific period may be intuitively compared with each other, the type of the image is not limited.

Figure 36:
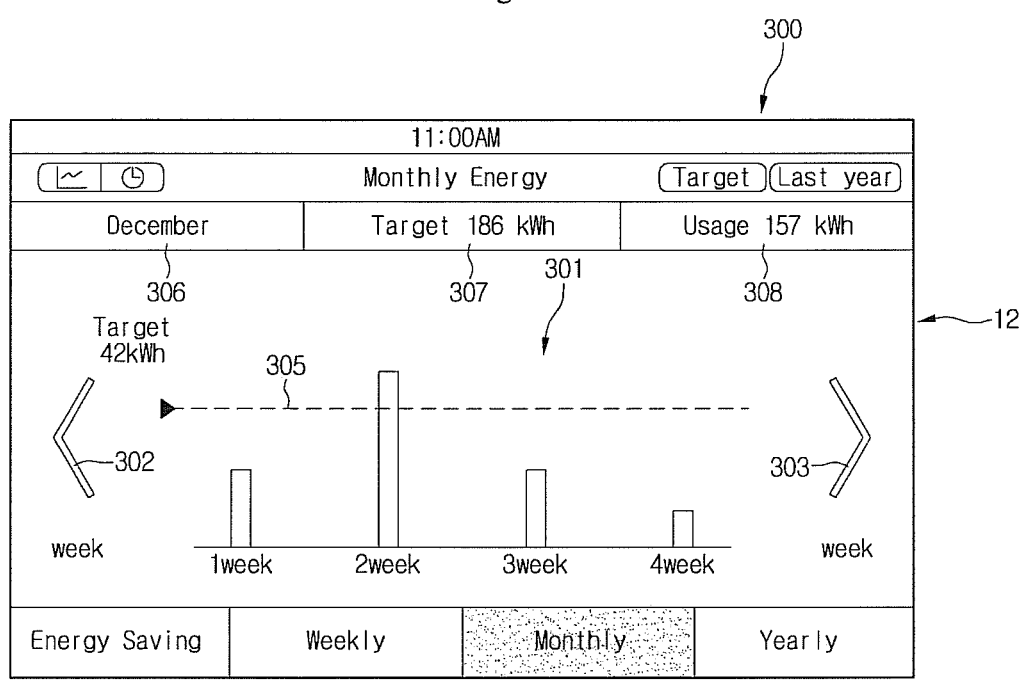

FIG. 36 illustrates a screen displayed when a monthly button is selected on the screen of FIG. 33. Referring to FIG. 36, when the monthly button 263 is selected on the screen of FIG. 33, the controller 4 may display a screen 300 for monitoring a monthly energy usage amount on the touch screen display 3. The screen 300 may display a monthly usage amount image 301 showing the energy usage amount for each week and a display line 305 displaying a weekly target usage amount.

The monthly usage amount image 301 may include a plurality of bar graphs displaying an energy usage amount for each week or for each period selected by the user. The bar graphs may be vertically oriented, and a height, the length, or size of the bar graphs may be changed according to the energy usage amount for each week. The display line 305 may be a horizontal line. The color of the bar graphs may be changed according to a result of comparison of the weekly target usage amount and the energy usage amount for each week. The controller 4 may compare the energy usage amount for each week and the weekly target usage amount, and may differently display the color, the size, or the length of the energy usage amount for each week according to the comparison result.

The screen 300 may include change buttons 302 and 303 for changing a week or a day to be displayed. For example, when a right button 303 is selected, the month may be changed or bar graphs of four weeks may disappear and bar graphs of five weeks or one week of a next month may appear.

Further, the screen 300 may include information 306 displaying the month, a monthly target energy usage amount 307, and a monthly actual energy usage amount 308.

Figure 37:
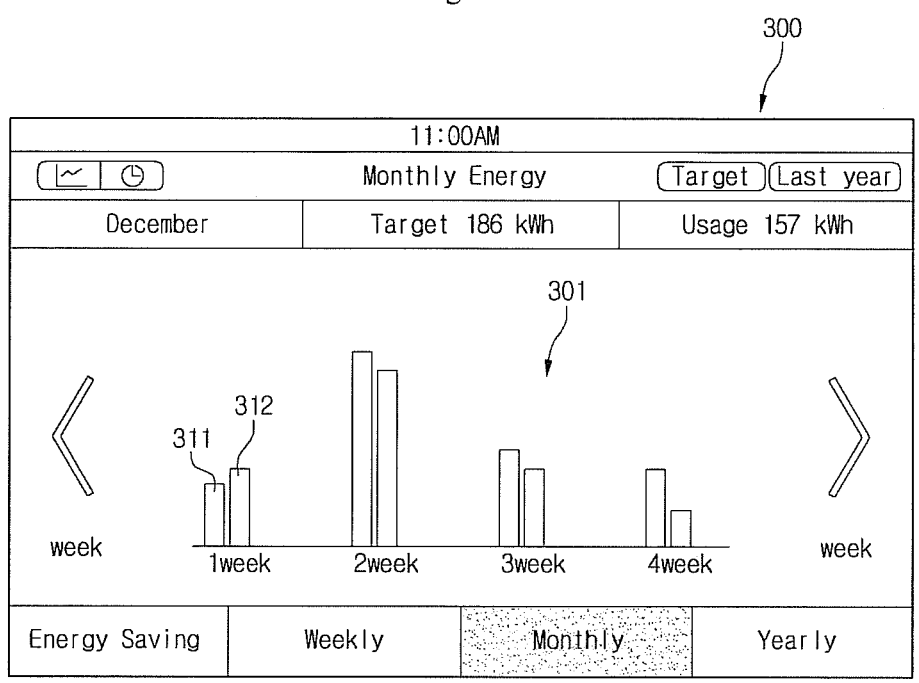

FIG. 37 illustrates a screen displayed when a last year button is selected on the screen of FIG. 36. Referring to FIG. 37, when the last year button 290 is selected on the screen 300 of FIG. 36, the controller 4 may display an image 310 for showing a preset energy usage amount and a last year energy usage amount on the screen 300 at the same time.

The image 310 may include a plurality of present bar graphs 312 displaying the energy usage amount for each week and a plurality of past bar graphs 311 displaying an energy usage amount in the same week of a previous year. That is, both the present bar graph 312 and the past bar graph 311 may be displayed for each week. In this case, the display line 305 displaying the target usage amount may disappear on the screen 300 of FIG. 37.

Figure 38:
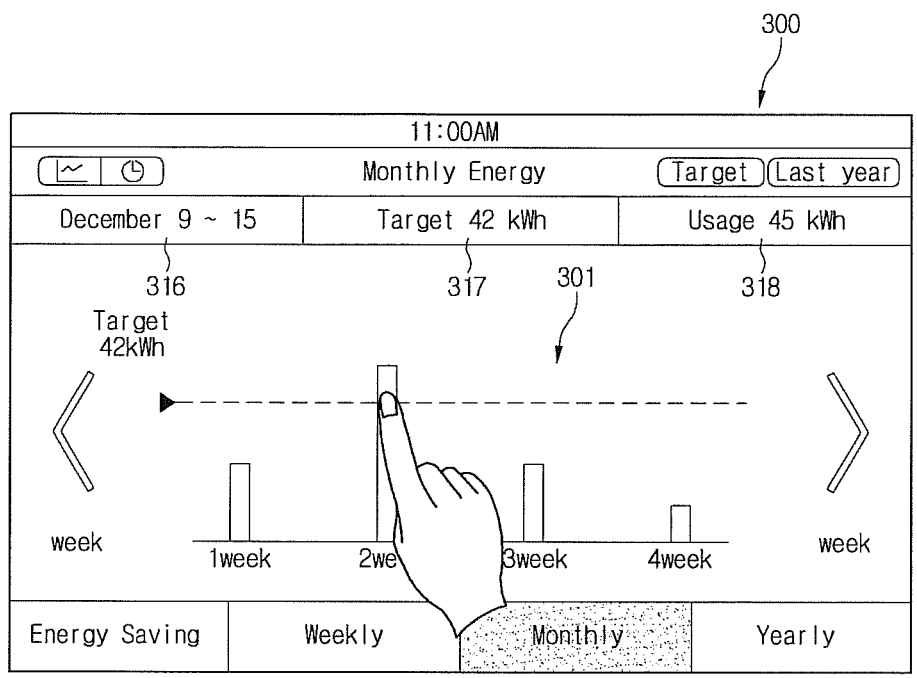

FIG. 38 illustrates a screen displayed when a specific day is touched on the screen displayed in FIG. 36. As the first image 301 is an image for comparing the target usage amount and the actual accumulated usage amount on the screen of FIG. 36, the user may touch the specific week on the screen 300 in order to accurately verify the energy usage amount of the specific week.

When the specific week (for example, a second week) is selected on the screen 300 displayed in FIG. 36, the screen 300 may display a selected week 306, a target energy usage amount 317, and an actual accumulated usage amount 318 of the selected week.

In FIGS. 36 to 38, the screen 300 may display the images 301 and 310 including the bar graphs, but alternatively, may display an image including a broken-line graph. Further, in FIG. 36, if the target usage amount and the energy usage amount for each week during a specific period may be intuitively compared with each other, a type of a displayed image is not limited. In FIG. 37, if the past energy usage amount and the energy usage amount for each week during the specific period may be intuitively compared with each other, the type of the displayed image is not limited.

Figure 39:
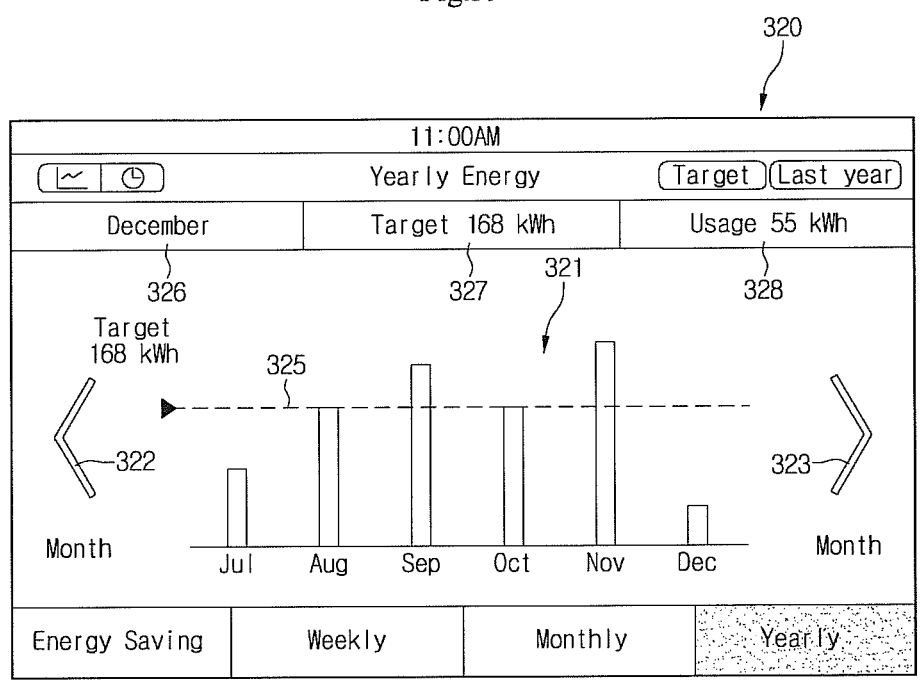

FIG. 39 illustrates a screen displayed when a yearly button is selected on the screen of FIG. 33. Referring to FIG. 39, when the yearly button 264 is selected on the screen of FIG. 33, the controller 4 may display a screen 320 for showing a yearly energy usage amount on the touch screen display 3. The screen 320 may display a yearly usage amount image 301 showing the yearly energy usage amount and a display line 325 displaying a monthly target usage amount.

The yearly usage amount image 321 may show an energy usage amount for 6 months in recent years. Of course, energy usage amounts for 12 months may be shown according to a size or configuration of the screen 320.

The yearly usage amount image 321 may include a plurality of bar graphs displaying an energy usage amount for each month. The bar graphs may be vertically oriented, and a height, length, or size of the bar graphs may be changed according to the energy usage amount for each month. The display line 325 may be a horizontal line. The color of the bar graphs may be changed according to a result of comparison of the monthly target usage amount and the energy usage amount for each month.

The controller 4 may compare the energy usage amount for each month and the monthly target usage amount, and may differently display the color, the size, or the length of the energy usage amount for each month according to the comparison result.

The screen 320 may include change buttons 322 and 323 for changing a year or a month to be displayed. For example, when a right button 323 is selected, the year may be changed or a bar graph of July may disappear and a bar graph of January may appear.

Further, the screen 320 may include information 326 displaying the month, a monthly target energy usage amount 327, and a monthly actual energy usage amount 328. For example, if the month is not changed by the change buttons 322 and 323, the information 326 displaying the month may display a present month.

Figure 40:
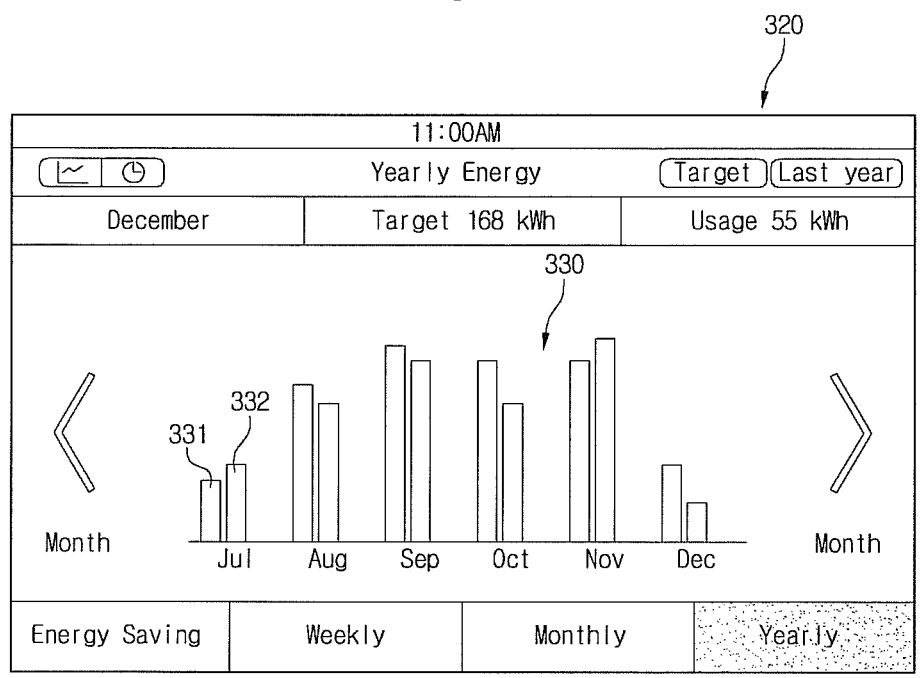

FIG. 40 illustrates a screen displayed when a last year button is selected on the screen of FIG. 39. Referring to FIG. 40, when the last year button 290 is selected on the screen 320 of FIG. 39, the controller 4 may display an image 330 for showing a preset energy usage amount and a last year energy usage amount on the screen 320 at the same time.

The image 330 may include a plurality of present bar graphs 332 displaying the energy usage amount for each month and a plurality of past bar graphs 331 displaying an energy usage amount in the same month of a previous year. That is, both the present bar graph 332 and the past bar graph 331 may be displayed for each month. In this case, the display line 325 displaying the target usage amount may disappear on the screen 320 of FIG. 40.

Figure 41:
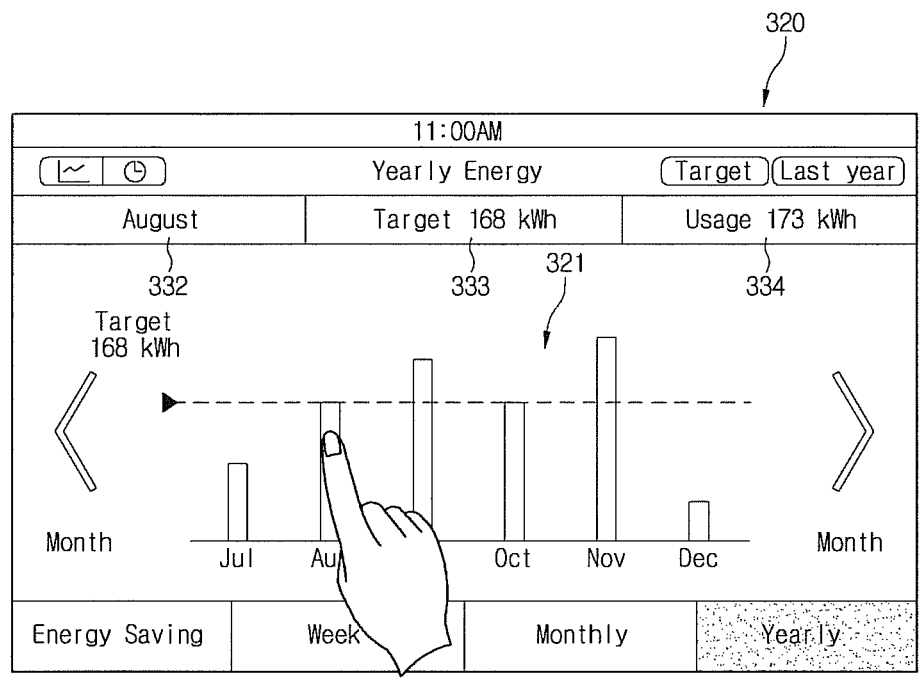

FIG. 41 illustrates a screen displayed when a specific day is touched on the screen displayed in FIG. 39. The user may touch a specific month on the screen 320 in order to accurately verify energy usage amounts of remaining months other than the present month. When the specific month (for example, August) is selected on the screen 320 displayed in FIG. 39, the screen 320 may display a selected month 332, a target energy usage amount 333, and an actual accumulated usage amount 334 of the selected week.

In FIGS. 39 to 41, the screen 320 displays the images 321 and 330 including the bar graphs, but alternatively, may display an image including a broken-line graph. Further, in FIG. 39, if the target usage amount and the energy usage amount for each month during a specific period may be intuitively compared with each other, the type of the displayed image is not limited. In FIG. 40, if the past energy usage amount and the energy usage amount for each month during the specific period may be intuitively compared with each other, the type of the displayed image is not limited.

FIGS. 33 to 41 illustrates a screen for showing the energy usage amount, but even when the usage time button 267 is selected, a screen for showing a usage time in the same pattern as FIGS. 33 to 41 may be displayed on the touch screen display. Accordingly, information including the energy usage amount and the usage time may be called usage information, and each of the energy usage amount and the usage time may be called a usage value.

Figure 42:
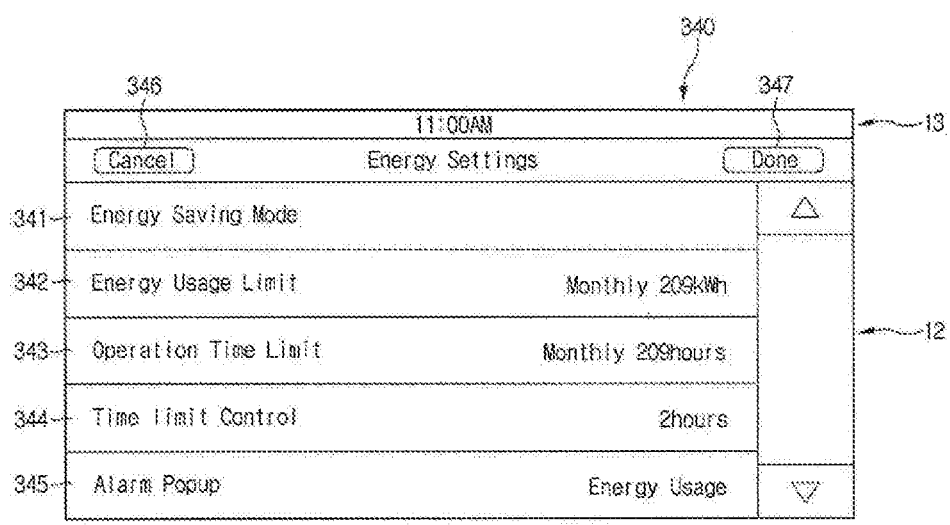
FIG. 42 illustrates a screen displayed when a set-up button is selected in FIG. 30 or 32.

FIG. 42 illustrates a screen displayed when a set-up button is selected in FIG. 30 or 32. Referring to FIG. 42, when the set-up buttons 265 or 275 are selected on the screen 250 of FIG. 30 or the screen 270 of FIG. 32, respectively, the controller 4 may display a screen 340 for setting energy on the touch screen display 3.

The screen 340 may include an energy saving mode button 341 for selecting an energy saving mode, an energy usage limit button 342 for selecting or setting an energy usage limit function, an operation time limit button 343 for selecting or setting an operation time limit function, a time limit control button 344 for selecting or setting a time limit control function, and an alarm popup button 344 for selecting an alarm popup.

The energy saving mode is a mode for saving energy. When the energy saving mode is turned on, one or more components of the HVAC system may be controlled by a control parameter set for energy saving. That is, when the energy saving mode is turned on, as one or more components of the HVAC system are operated within a limited control parameter range, the energy usage limit function may be achieved.

The energy usage limit function is a function for limiting energy usage. When the energy usage limit function is turned on, an alarm may occur on the touch screen display 3 in the case where the energy usage amounts of one or more components of the HVAC system reach a set energy usage amount.

The operation time limit function is a function for limiting an operation time of one or more components of the HVAC system. When the operation time limit function is turned on, the alarm may occur on the touch screen display 3 in the case where the operation time of one or more components of the HVAC system reach a set operation time.

The time limit control function is a function for setting an off time of one or more components of the HVAC system. When the time limit control function is turned on, the controller 4 turns off one or more components of the HVAC system in the case where one or more components are turned on and a set limited time elapses.

The screen 340 may further include a cancel button 346 and a done button 347.

The energy usage limit button 342 may display a set limited usage amount, and each of the operation time limit button 343 and the time limit control button 344 may include a set limit time. The alarm popup button 344 may include a type of a popup-on function. A function which may pop up is the energy usage limit function or the operation time limit function.

Figure 43:
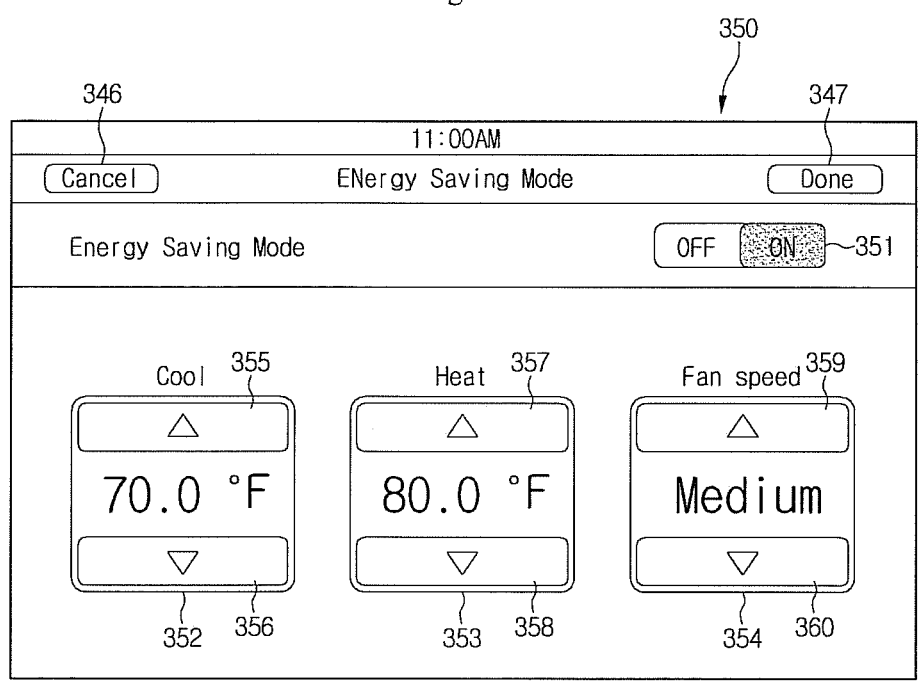
FIG. 43 illustrates a screen displayed when an energy saving mode button is selected in FIG. 42.

FIG. 43 illustrates a screen displayed when an energy saving mode button is selected in FIG. 42. Referring to FIG. 43, when the energy saving mode button 341 is selected on the screen 340 of FIG. 42, the controller 4 may display a screen 350 for setting a control parameter for the energy saving mode on the touch screen display 3. The screen 350 may include an on/off button 351 for turning on or off the energy saving mode.

The screen 350 may include a cooling temperature set-up block 352 for setting a temperature in a cooling mode, a heating temperature set-up block 353 for setting a temperature in a heating mode, and a fan speed set-up block 354 for setting a fan speed. The set-up blocks 352, 353, and 354 may include up buttons 355, 357, and 359 and down buttons 356, 358, and 360, respectively.

The screen 350 may display the respective set-up blocks 352, 353, and 354 when the energy saving mode is turned on by the on/off button 351. When the energy saving mode is turned off by the on/off button 351, the screen 350 may not display the respective set-up blocks 352, 353, and 354 or may display the respective set-up blocks 352, 353, and 354, but may inactivate the respective set-up blocks 352, 353, and 354.

While one or more components of the HVAC system are cooling-operated, when the energy saving mode is turned on, one or more components of the HVAC system may be operated to satisfy a set cooling temperature and a set fan speed in the cooling temperature set-up block 352.

Further, while one or more components of the HVAC system are heating-operated, when the energy saving mode is turned on, one or more components of the HVAC system are operated to satisfy a set heating temperature and a set fan speed in the heating temperature set-up block 353.

The screen 350 may further include a cancel button 346 and a done button 347. When the cancel button 346 is selected, the screen 350 may be switched to the screen 340 of FIG. 42. When the done button 347 is selected, the set control parameter may be stored in the memory 5 and the screen 350 may be switched to the screen 340 of FIG. 42.

The temperature and the fan speed set on the screen of FIG. 43 may be limit parameters.

Figure 44:
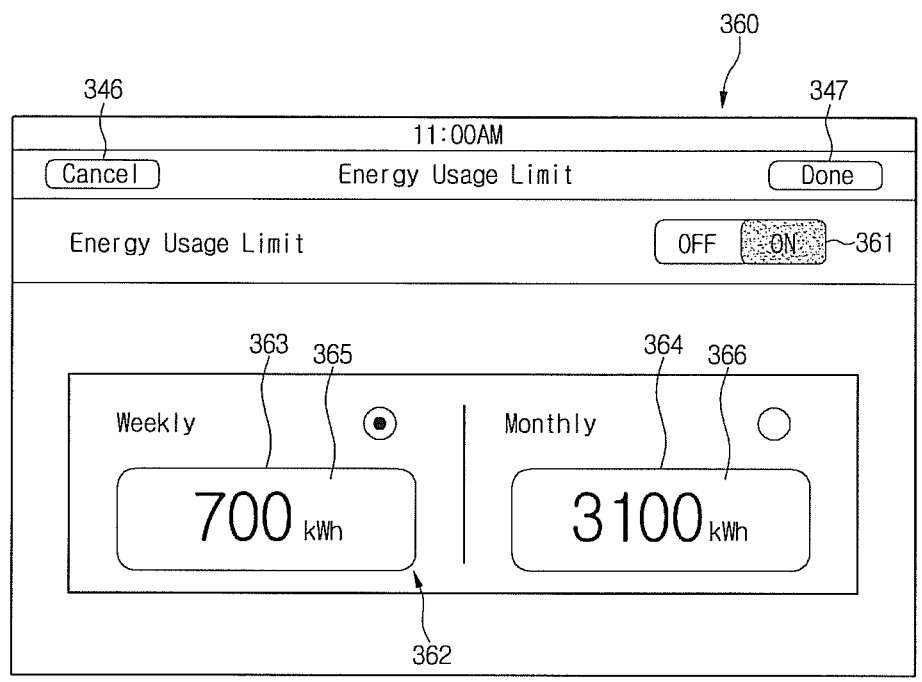
FIG. 44 illustrates a screen displayed when an energy usage limit button is selected in FIG. 42.

FIG. 44 illustrates a screen displayed when an energy usage limit button is selected in FIG. 42. Referring to FIG. 44, when the energy usage limit button 342 is selected on the screen 342 of FIG. 42, the controller 4 may display a screen 360 for setting a control parameter for the energy usage limit function on the touch screen display 3.

The screen 360 may include an on/off button 361 for turning on or off the energy usage limit function. The screen 360 may further include a limit usage amount set-up button 362 for setting an energy usage amount. The limit usage amount set-up button 362 may include a weekly set-up button 363 (first section button) for setting a weekly limit usage amount and a monthly set-up button 364 (second section button) for setting a monthly limit usage amount. The weekly set-up button 363 may include a weekly limit setting amount 365 and the monthly set-up button 364 includes a monthly limit setting amount 366.

The screen 360 may display the usage amount set-up button 362 when the energy usage limit function is turned on by the on/off button 361. The screen 360 may not display the usage amount set-up button 362, or may display the usage amount set-up button 362, but may inactivate the usage amount set-up button 362 when the energy usage limit function is turned off by the on/off button 361.

After any one of the weekly set-up block 363 or the monthly set-up button 364 is selected, the usage amount may be set by selecting the usage amount in the corresponding button.

The screen 360 may further include a cancel button 346 and a done button 347. When the cancel button 346 is selected, the screen 360 may be switched to the screen 340 of FIG. 42. When the done button 347 is selected, the set control parameter may be stored in the memory 5 and the screen 360 may be switched to the screen 340 of FIG. 42.

A limit setting amount set in FIG. 44 may be called a limit parameter.

Figure 45:
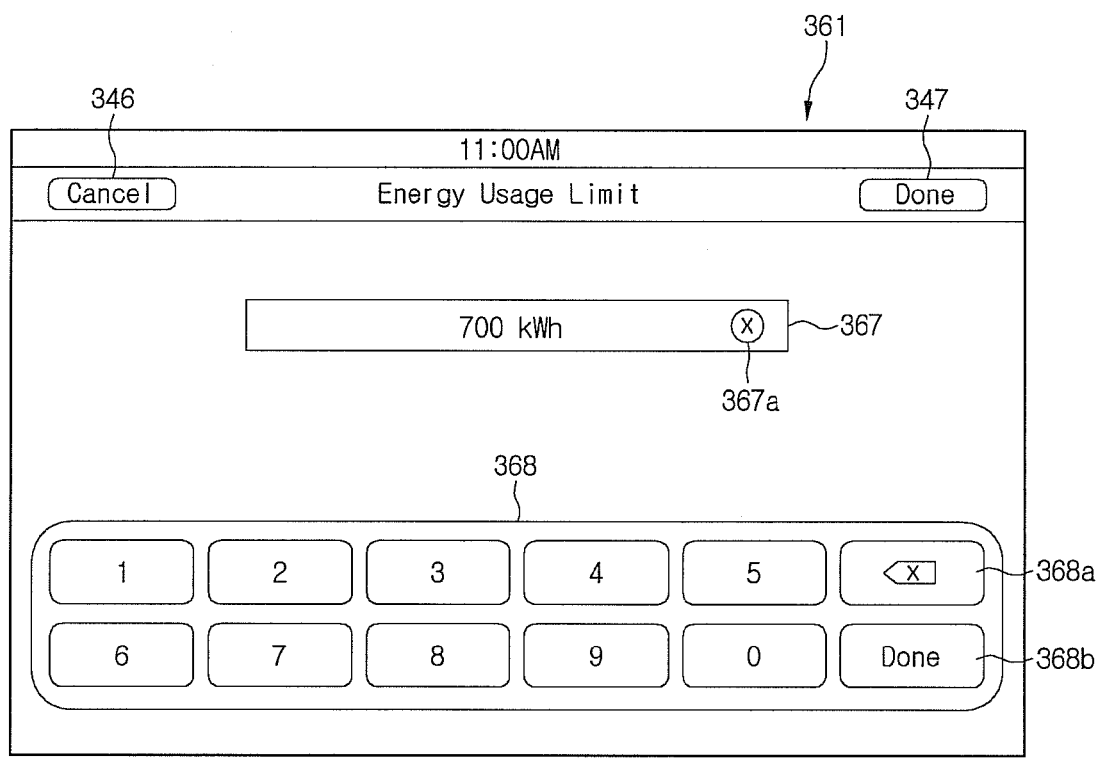
FIG. 45 illustrates a screen for setting a weekly limit usage amount for an energy usage limit function.

FIG. 45 illustrates a screen for setting a weekly limit usage amount for an energy usage limit function. Referring to FIG. 45, when, for example, the weekly limit usage amount 365 is selected on the screen of FIG. 44, the controller 4 may display a screen 361 for inputting a limit usage amount on the touch screen display 3.

The screen 361 may display a keypad 368 for setting the weekly limit usage amount and usage amount information 367 displaying the limit usage amount input by the keypad 368. The keypad 368 may include a plurality of number buttons, a modification button 368a, and an input done button 368b. The usage amount information 367 may include a deletion button 367a for deleting the set limit usage amount.

When the monthly limit setting amount 366 is selected on the screen of FIG. 44, the screen 360 may display a keypad for the monthly limit usage amount and usage amount information displaying the limit usage amount input by the keypad.

The screen 361 may further include a cancel button 346 and a done button 347. When the cancel button 346 is selected, the screen 361 may be switched to the screen 360 of FIG. 44. When the done button 347 is selected, the set limit usage amount may be stored in the memory 5 and the screen 361 may be switched to the screen 360 of FIG. 44.

The limit setting amount set in the screens of FIGS. 44 and 45 may be called a limit parameter.

Figure 46:
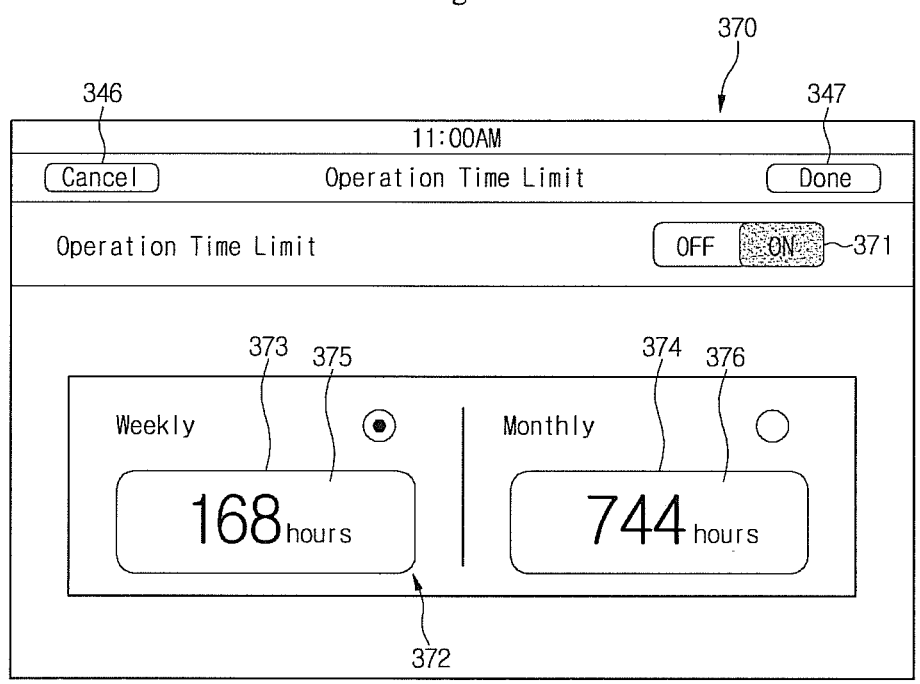
FIG. 46 illustrates a screen displayed when an operating time limit button is selected in FIG. 42.

FIG. 46 illustrates a screen displayed when an operating time limit button is selected in FIG. 42. Referring to FIG. 46, when the operation time limit button 343 is selected on the screen 340 of FIG. 42, the controller 4 may display a screen 370 for setting a control parameter for the energy usage limit function on the touch screen display 3.

The screen 370 may include an on/off button 371 for turning on or off the operation time limit function. The screen 370 may further include a limit time set-up button 372 for setting a limit time. The limit time set-up button 372 may include a weekly set-up button 373 (first section button) for setting a weekly limit time and a monthly set-up button 374 (second section button) for setting a monthly limit time. The weekly set-up button 373 may include a weekly limit time 375, and the monthly set-up button 364 may include a monthly limit time 376.

The screen 370 may display the limit time set-up button 372 when the operation time limit function is turned on by the on/off button 371. The screen 370 may not display the limit time set-up button 372, or may display the limit time set-up button 372, but may inactivate the limit time set-up button 372 when the operation time limit function is turned off by the on/off button 371.

After any one of the weekly set-up block 373 or the monthly set-up button 374 is selected, the limit time may be set by selecting the time in the corresponding button.

The screen 370 may further include a cancel button 346 and a done button 347.

Figure 47:
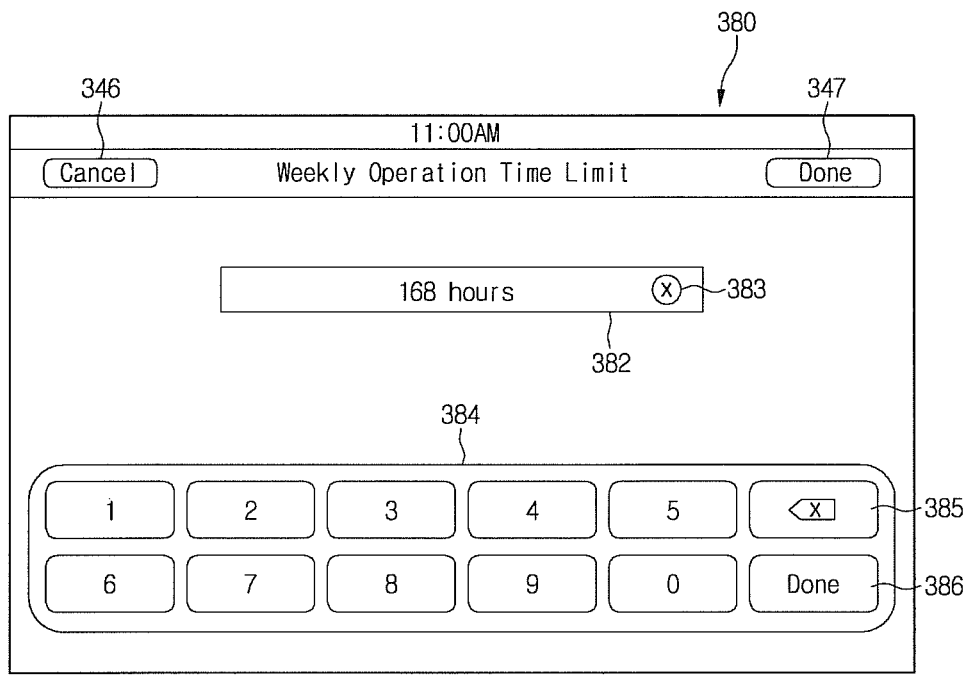
FIG. 47 illustrates a screen for setting a weekly limit time for an operating time limit function.

FIG. 47 illustrates a screen for setting a weekly limit time for an operation time limit function. Referring to FIG. 47, when, for example, the weekly limit time 375 is selected on the screen of FIG. 46, the controller 4 may display a screen 380 for inputting a limit time on the touch screen display 3.

The screen 380 may display a keypad 384 for setting the weekly limit time and limit time information 382 displaying the limit time input by the keypad 384. The keypad 384 may include a plurality of number buttons, a modification button 385, and an input done button 386b. The usage limit information 382 may include a deletion button 383 for deleting a set usage amount.

When the monthly limit setting amount 376 is selected on the screen of FIG. 46, the screen 380 may display a keypad for setting the limit time and limit time information displaying the limit time input by the keypad.

The screen 380 may further include a cancel button 346 and a done button 347. When the cancel button 346 is selected, the screen 380 may be switched to the screen 370 of FIG. 46. When the done button 347 is selected, the set limit time may be stored in the memory 5 and the screen 370 may be switched to the screen 370 of FIG. 46.

The limit time set in the screens of FIGS. 46 and 47 may be called a limit parameter.

Figure 48:
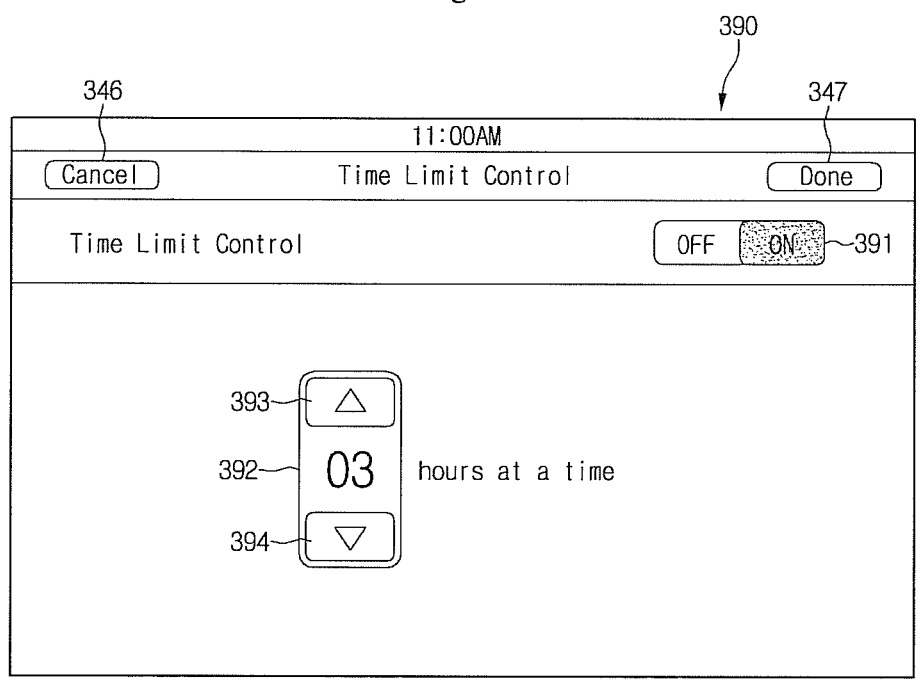
FIG. 48 illustrates a screen displayed when a time limit control button is selected in FIG. 42.

FIG. 48 illustrates a screen displayed when a time limit control button is selected in FIG. 42. Referring to FIG. 48, when the time limit control button 344 is selected on the screen 340 of FIG. 42, the controller 4 may display a screen 390 for setting a control parameter for the time limit control function on the touch screen display 3.

The screen 390 may include an on/off button 391 for turning on or off the time limit control function. The screen 390 may further include a time set-up button 392 for setting an off time. The time set-up button 392 may include an up button 393 and a down button 394. When the up button 393 may be touched, the time is increased and when the down button 394 is touched, the time may be decreased.

The screen 390 may display the time set-up button 392 when the time limit control function is turned on by the on/off button 391. The screen 390 may not display the time set-up button 392, or may display the time set-up button 392, but may inactivate the time set-up button 392 when the time limit control function is turned off by the on/off button 391.

The screen 390 may further include a cancel button 346 and a done button 347. When the cancel button 346 is selected, the screen 390 may be switched to the screen 340 of FIG. 42. When the done button 347 is selected, a set off time may be stored in the memory 5 and the screen 390 may be switched to the screen 340 of FIG. 42.

Figure 49:
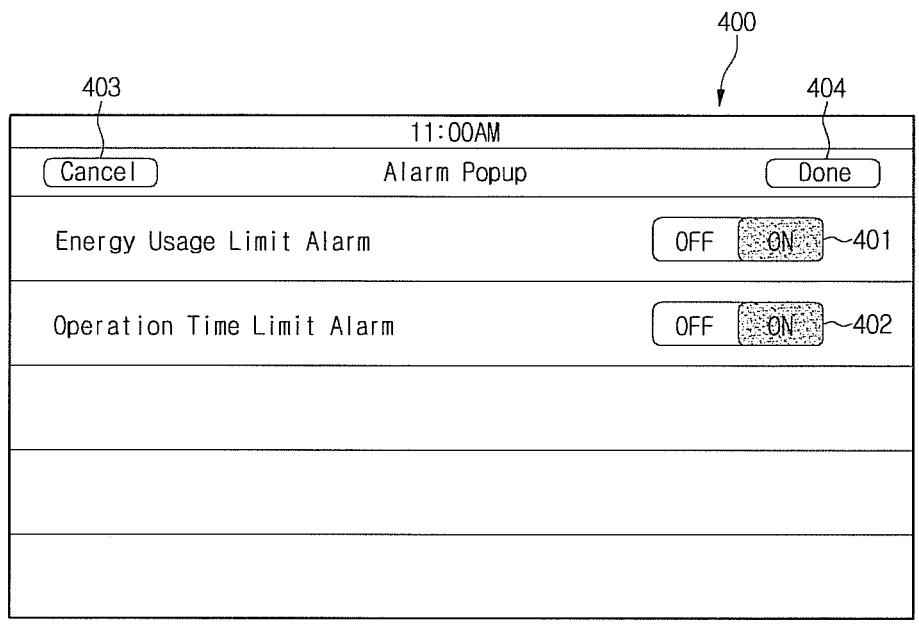
FIG. 49 illustrates a screen displayed when a pop-up alarm button is selected in FIG. 42.

FIG. 49 illustrates a screen displayed when a pop-up alarm button is selected in FIG. 42. Referring to FIG. 49, when the pop-up alarm button 345 is selected on the screen 340 of FIG. 42, the controller 4 may display a screen 400 for setting a pop-up alarm function on the touch screen display 3.

The screen 400 may include an on/off button 401 for turning on/off an alarm for the energy usage limit function and an on/off button 410 for turning on/off an alarm for the operation time limit function. The respective alarms may be simultaneously turned on or off and only any one alarm may be turned on.

Figure 50:
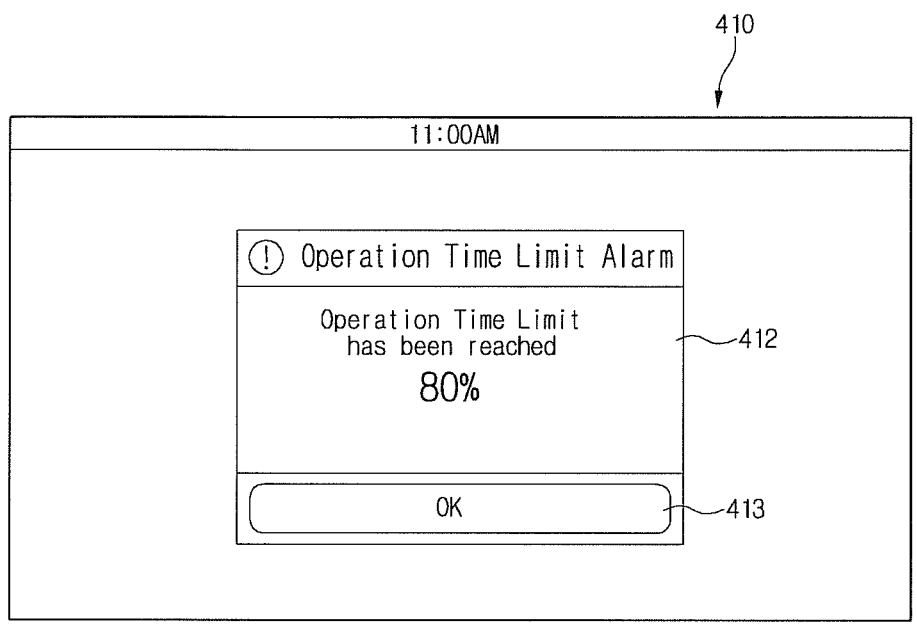
Figure 51:
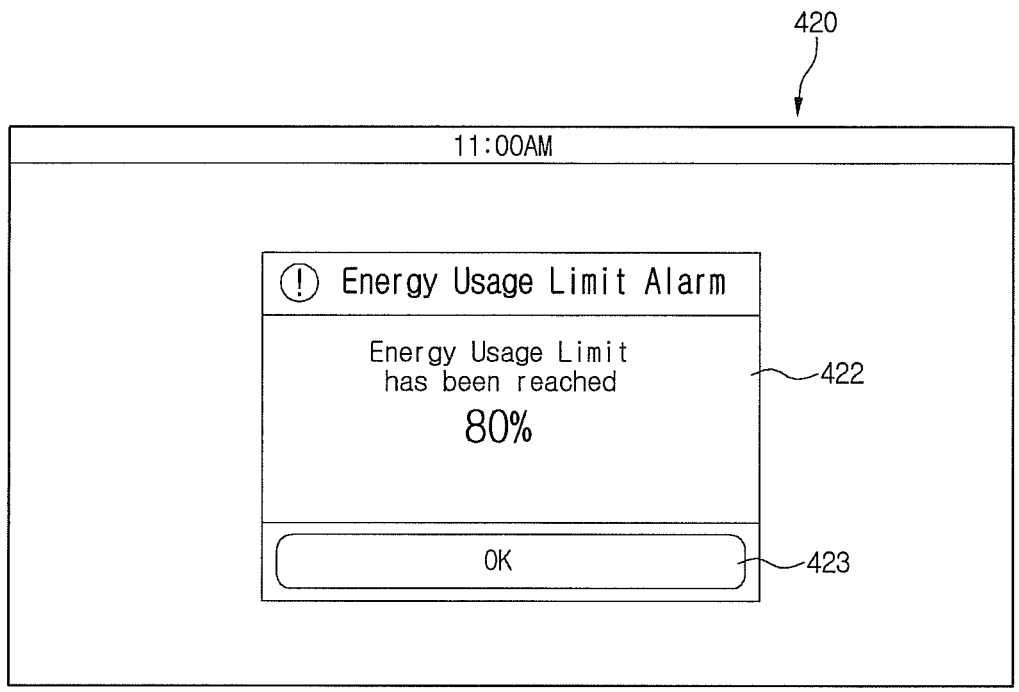

FIG. 50 illustrates a screen on which alarm information pops up in a state where an alarm for the operating time limit function is on. FIG. 51 illustrates a screen on which the alarm information pops up in a state where an alarm for the energy usage limit function is on.

Referring to FIG. 50, when the operation time limit function is turned on and an alarm function is turned on, the controller 4 may compare an actual usage time of one or more components of the HVAC system and a set limit time. In addition, when a ratio of the actual usage time to the set limit time reaches a reference ratio, the controller 44 may display a screen 410 including the pop-up information 412. The pop-up information 412 may include a text message.

Further, the pop-up information 412 may include an OK button 413. When the OK button 413 is selected, the screen 410 may be switched to a previously displayed screen. Alternatively, when a predetermined time during which the screen 410 including the pop-up information 412 is displayed elapses, the screen 410 may be switched to the previously displayed screen. In this case, as only the pop-up information 412 pops up on the previously displayed screen, only the pop-up information may disappear.

In this case, the reference ratio may include one or a plurality of ratios. When the plurality of reference ratios are set, whenever the ratio of the actual usage time to the set limit time reaches each reference ratio, the controller 4 may display the screen 410 including the pop-up information 412.

Next, referring to FIG. 51, when the energy usage limit function is turned on and the alarm function is turned on, the controller 4 may compare actual usage amounts time of one or more components of the HVAC system and a limit usage amount. In addition, when a ratio of the actual usage amount to the set limit usage amount reaches a reference ratio, the controller 4 may display a screen 422 including the pop-up information 422. The pop-up information 422 may include a text message.

Further, the pop-up information 422 may include an OK button 423. When the OK button 423 is selected, the screen 420 may be switched to a previously displayed screen. Alternatively, when a predetermined time during which the screen 420 including the pop-up information 422 is displayed elapses, the screen 420 may be switched to the previously displayed screen. In this case, as only the pop-up information 422 pops up on the previously displayed screen, only the pop-up information may disappear.

In this case, the reference ratio may include one or a plurality of ratios. When the plurality of reference ratios are set, whenever the ratio of the actual usage amount to the set limit usage amount reaches each reference ratio, the controller 4 may display the screen 4202 including the pop-up information 422.

According to embodiments, when the touch screen display 3 receives a control parameter of one or more components of the HVAC system among parameter setting values, the HVAC controller 1 may transmit a setting value of the received control parameter to one or more components of the HVAC system. Further, when the control parameter of one or more components of the HVAC system is changed, the HVAC controller 1 may receive the changed control parameter value from one or more components of the HVAC system to store the changed control parameter value in the memory 5 and reflect the value on the screen of the touch screen display 3.

In one embodiment, a heating, ventilation, or air conditioning (HVAC) controller for controlling one or more components of a HVAC system or monitoring a state thereof may include a touch screen display in which a parameter setting command may be input by a user's touch, and a controller connected with the touch screen display to display a screen on the touch screen display. The controller may display a function selection screen to select a type of a limit function when receiving a command for selecting limit functions of one or more components of the HVAC system, the controller may display a set-up screen for inputting a limit parameter on the touch screen display when a specific limit function is selected on the function selection screen, and the set-up screen may include a set-up button for inputting the limit parameter.

In another embodiment, a heating, ventilation, or air conditioning (HVAC) controller for controlling one or more components of a HVAC system or monitoring a state thereof may include a touch screen display in which a parameter setting command is input by a user's touch, and a controller connected with the touch screen display to display a screen on the touch screen display. When the controller receives a command for selecting limit functions of one or more components of the HVAC system, the controller may display a set-up screen for inputting a limit parameter on the touch screen display, the set-up screen may include a set-up button for inputting the limit parameter, the limit parameter set by the set-up button may include at least one of a temperature, a time, an energy usage amount, or a fan speed, and the controller may compare the set limit parameter and usage values of one or more components of the HVAC system and display a screen including pop-up information on the touch screen display when a ratio of an actual usage value for the limit parameter reaches a reference ratio.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A heating, ventilation, or air conditioning (HVAC) controller for controlling one or more components of a HVAC system or monitoring a state thereof, the HVAC controller comprising
    a touch screen display that receives a parameter setting command input by a user's touch;
    a controller connected with the touch screen display to display a screen on the touch screen display, wherein the controller displays a function selection screen to select a type of a limit function when the controller receives a command for selecting limit functions of one or more components of the HVAC system; and
    a memory that stores an input limit parameter, wherein the controller displays a set-up screen to input the limit parameter on the touch screen display when a specific limit function is selected on the function selection screen, wherein the set-up screen includes a set-up button to input the limit parameter, wherein the controller compares the limit parameter stored in the memory and accumulated usage values of the one or more components of the HVAC system and displays a screen including pop-up information on the touch screen display when a ratio of an accumulated actual usage value to the limit parameter reaches at least one predetermined reference ratio, wherein the at least one predetermined reference ratio includes a first reference ratio and a second reference ratio greater than the first reference ratio, wherein each of the first reference ratio and the second reference ratio is less than 100 percent, wherein when the one or more components of the HVAC system is operated, the accumulated usage values increase, wherein the controller displays the screen including the pop-up information on the touch screen display when the ratio of the accumulated actual usage value to the limit parameter reaches the first reference ratio, and wherein after the pop-up information disappears, the controller displays the pop-up information on the touch screen display when the ratio of the accumulated actual value to the limit parameter reaches the second reference ratio.

2. The HVAC controller of claim 1, wherein the function selection screen includes a plurality of buttons for selection of each limit function type.

3. The HVAC controller of claim 2, wherein the plurality of buttons includes two or more buttons of an energy saving mode button to control one or more components of the HVAC system within a limit parameter range, an energy usage limit button to limit an energy usage amount, an operation time limit button to limit an energy usage time, or a time limit control button to limit an on time of one or more components of the HVAC system.

4. The HVAC controller of claim 3, wherein one or more buttons of the plurality of buttons display a set limit parameter.

5. The HVAC controller of claim 1, wherein the set-up screen includes an on/off button to turn on or off a set limit function.

6. The HVAC controller of claim 5, wherein when function off is selected by the on/off button, the set-up button disappears on the set-up screen.

7. The HVAC controller of claim 5, wherein when the function off is selected by the on/off button, the set-up button is displayed on the set-up screen, but the set-up button is deactivated.

8. The HVAC controller of claim 7, wherein the set-up button further includes a button to set a fan speed.

9. The HVAC controller of claim 1, wherein the set-up button includes a button to set a cooling temperature and a button to set a heating temperature.

10. The HVAC controller of claim 1, wherein the set-up button includes a first section button and a second section button to select a type of a section, and wherein each of the first section button and the second section button displays a set limit parameter.

11. The HVAC controller of claim 10, wherein when the limit parameter of any one section button of the first and second section buttons is selected, the controller displays a keypad to input the limit parameter on the set-up screen.

12. The HVAC controller of claim 11, wherein the set-up screen displays limit parameter information to display the input limit parameter, and wherein the limit parameter information includes a delete button to delete the input limit parameter.

13. The HVAC controller of claim 11, wherein the limit parameter is an energy usage amount or an operation time.

14. The HVAC controller of claim 1, wherein the limit parameter is a time, and the set-up button includes an up button and a down button to change the time.

15. The HVAC controller of claim 1, wherein the pop-up information includes a text message.

16. The HVAC controller of claim 15, wherein the pop-up information further includes an OK button, and wherein when the OK button is selected, the screen is switched to a previously displayed screen.

17. The HVAC controller of claim 15, wherein when a predetermined period of time during which the screen including the pop-up information is displayed elapses, the screen is switched to a previously displayed screen.

18. A heating, ventilation, or air conditioning (HVAC) controller for controlling one or more components of a HVAC system or monitoring a state thereof, the HVAC controller comprising
- a touch screen display that receive a parameter setting command input by a user's touch; and
- a controller connected with the touch screen display to display a screen on the touch screen display, wherein when the controller receives a command for selecting limit functions of one or more components of the HVAC system, the controller displays a set-up screen to input a limit parameter on the touch screen display, wherein the set-up screen includes a set-up button to input the limit parameter, wherein the limit parameter set by the set-up button includes at least one of a temperature, a time, an energy usage amount, or a fan speed, wherein the controller compares the limit parameter and accumulated usage values of the one or more components of the HVAC system and displays a screen including pop-up information on the touch screen display when a ratio of an accumulated actual usage value to the limit parameter reaches a predetermined reference ratio, wherein the predetermined reference ratio includes a first reference ratio and a second reference ratio greater than the first reference ratio, wherein each of the first reference ratio and the second reference ratio is less than 100 percent, wherein when the one or more components of the HVAC system is operated, the accumulated usage values increase, wherein the controller displays the screen including the pop-up information on the touch screen display when the ratio of the accumulated actual usage value to the limit parameter reaches the first reference ratio, and wherein after the pop-up information disappears, the controller displays the pop-up information on the touch screen display when the ratio of the accumulated actual value to the limit parameter reaches the second reference ratio.

* * * * *